US012621179B2

(12) United States Patent
Mistry et al.

(10) Patent No.: US 12,621,179 B2
(45) Date of Patent: May 5, 2026

(54) SYSTEMS AND METHODS FOR MANAGING MEDICAL DEVICE NETWORK COMMUNICATION

(71) Applicant: Stryker Corporation, Kalamazoo, MI (US)

(72) Inventors: Neel Mistry, Haslet, TX (US); Eric Alexander Hereford, North Richland Hills, TX (US); Brandon B. Hunter, Hollister, CA (US)

(73) Assignee: Stryker Corporation, Portage, MI (US)

( * ) Notice: Subject to any disclaimer, the term of this patent is extended or adjusted under 35 U.S.C. 154(b) by 339 days.

(21) Appl. No.: 18/542,503

(22) Filed: Dec. 15, 2023

(65) Prior Publication Data

US 2024/0214236 A1 Jun. 27, 2024

Related U.S. Application Data

(60) Provisional application No. 63/476,638, filed on Dec. 21, 2022.

(51) Int. Cl.
H04L 12/18 (2006.01)
H04L 61/5069 (2022.01)

(52) U.S. Cl.
CPC ...... H04L 12/1886 (2013.01); H04L 12/1845 (2013.01); H04L 61/5069 (2022.05)

(58) Field of Classification Search
CPC . H04L 12/18; H04L 12/1845; H04L 12/1886; H04L 61/5069; H04L 61/5084; H04L 67/52; H04W 4/02; H04W 8/26; H04W 80/04
See application file for complete search history.

(56) References Cited

U.S. PATENT DOCUMENTS

| 7,660,878 B2 | 2/2010 | Castaldi et al. |
| 8,102,849 B2 | 1/2012 | Martinez et al. |
| 9,874,911 B2 | 1/2018 | Rhoads et al. |

(Continued)

OTHER PUBLICATIONS

Extended European Search Report dated Mar. 25, 2024, directed to EP Application No. 23218823.5; 7 pages.

(Continued)

*Primary Examiner* — Thomas R Cairns
(74) *Attorney, Agent, or Firm* — Morrison & Foerster LLP

(57) ABSTRACT

A method of controlling a medical device for transmitting and/or receiving a data stream through a medical network, the method comprising transmitting and/or receiving the data stream over the medical network by a network interface using a multicast address stored in a memory of the medical device. Upon powering up the medical device, the method further comprises disabling the network interface from transmitting and/or receiving the data stream using the multicast address. The method further comprises determining whether to continue to use the multicast address. In accordance with a determination to continue to use the multicast address, the method further comprises enabling the network interface such that the network interface can transmit and/or receive the data stream using the multicast address. In accordance with a determination not to continue to use the multicast address, the method further comprises clearing the multicast address from memory and enabling the network interface.

20 Claims, 10 Drawing Sheets

(56) References Cited

U.S. PATENT DOCUMENTS

| | | | |
|---|---|---|---|
| 2007/0070946 | A1 | 3/2007 | Dorenbosch et al. |
| 2011/0261725 | A1* | 10/2011 | Nakamura .............. H04L 12/42 |
| | | | 370/258 |
| 2012/0033600 | A1 | 2/2012 | Jo et al. |
| 2015/0381565 | A1* | 12/2015 | Thaler ................. H04L 61/5046 |
| | | | 370/389 |
| 2020/0008018 | A1 | 1/2020 | Moustafa et al. |
| 2021/0099420 | A1 | 4/2021 | Zhang |
| 2022/0417212 | A1* | 12/2022 | Krizan ............. H04N 21/44227 |

OTHER PUBLICATIONS

Office Action dated Feb. 13, 2025, directed to EP Application No. 23218823.5; 6 pages.
Office Action dated Sep. 3, 2025, directed to EP Application No. 23218823.5; 5 pages.
Romdhani et al. (Mar. 31, 2004). "IP Mobile Multicast: Challenges and Solutions," IEEE Communications Surveys and Tutorials 6(1):18-41.

\* cited by examiner

300

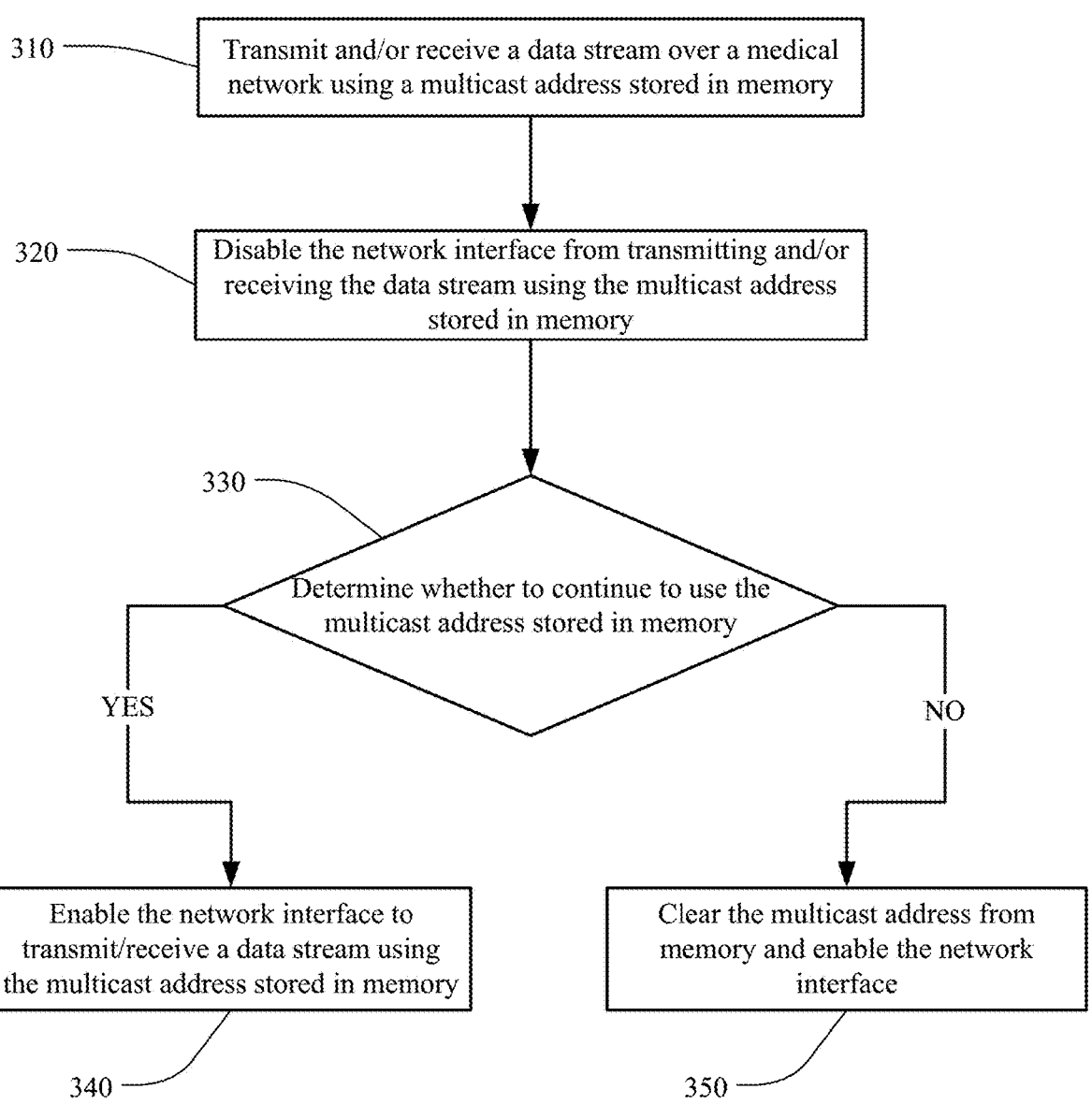

310 — Transmit and/or receive a data stream over a medical network using a multicast address stored in memory 320 — Disable the network interface from transmitting and/or receiving the data stream using the multicast address stored in memory 330 — Determine whether to continue to use the multicast address stored in memory

YES

NO

Enable the network interface to transmit/receive a data stream using the multicast address stored in memory Clear the multicast address from memory and enable the network interface

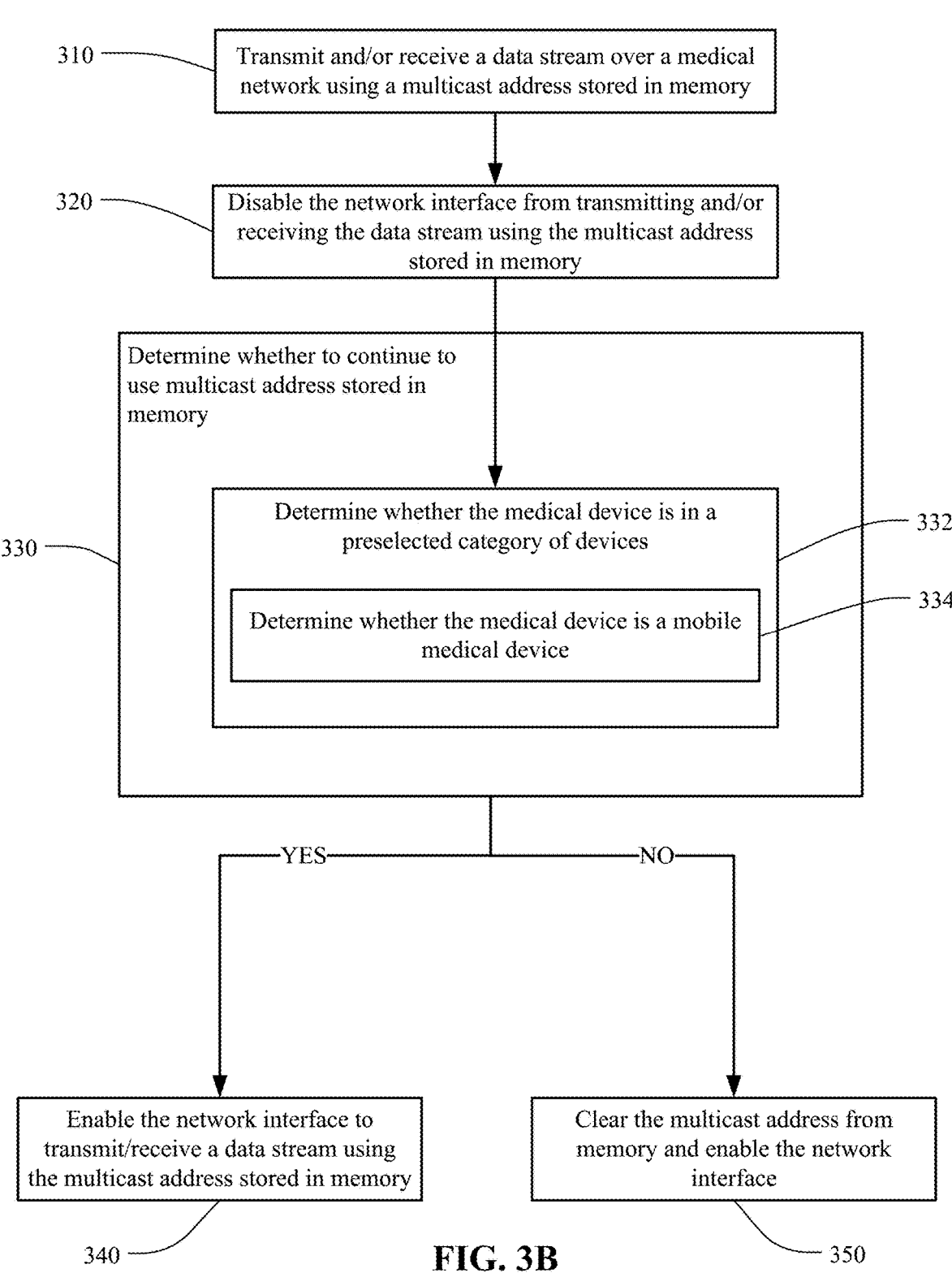

310 — Transmit and/or receive a data stream over a medical network using a multicast address stored in memory 320 — Disable the network interface from transmitting and/or receiving the data stream using the multicast address stored in memory Determine whether to continue to use multicast address stored in memory

330 —

Determine whether the medical device is in a preselected category of devices — 332

Determine whether the medical device is a mobile medical device — 334

—YES—                    —NO—

Enable the network interface to transmit/receive a data stream using the multicast address stored in memory

340 —

Clear the multicast address from memory and enable the network interface

610 — Determine whether to continue to use the multicast address stored in memory

YES

NO

Enable the network interface to transmit/receive a data stream using the multicast address stored in memory

620

630 — Clear the multicast address from memory and enable the network interface

640 — Receive new multicast address

650 — Store new multicast address in memory

700

SYSTEMS AND METHODS FOR MANAGING MEDICAL DEVICE NETWORK COMMUNICATION

CROSS-REFERENCE TO RELATED APPLICATIONS

This application claims the benefit of U.S. Provisional Application No. 63/476,638, filed Dec. 21, 2022, the entire contents of which are hereby incorporated by reference herein.

FIELD

This disclosure generally relates to medical device communication, and more specifically, to managing multicast addresses associated with medical devices.

BACKGROUND

Medical rooms can include devices connected to a network that transmit data through the network and/or receive data from the network. A given device can be assigned multicast addresses on the network that define the network locations to which data from the device is routed or can subscribe to multicast addresses on the network that define the network locations from which the device receives data. Routes between devices on the network can be maintained through power loss by storing the multicast addresses in non-volatile memory on the devices. When a device is powered up after a power loss and reconnects to the network, data routing to and/or from the device is preserved by the stored multicast addresses. A common reason that a device in a medical room may lose power is that the device is unplugged so that it could be moved to a different location. Some devices in medical rooms may be mobile devices that are intended to be moved from one room to another. For example, imaging systems are often mobile so that they can be moved from one medical room to another, as needed.

Different medical rooms may have different networks and the multicast addressing on one network may not be usable on another network. When a mobile device is unplugged, moved to a different medical room that has a different network, and powered up again, the mobile device may use the multicast addresses it was using in the other medical room prior to being unplugged, which may potentially lead to conflicts as the multicast addresses may be directed to different network devices or different data routes.

SUMMARY

According to an aspect, systems and methods include controlling how a device communicates on a network when powering up after a power loss. When the device powers up again after losing power, but before the device starts communicating on the network, the device may determine whether it should continue to use multicast addresses it was using to communicate prior to the power loss. If the device determines that it should continue to use the multicast addresses, then the device can continue to communicate on the network using the multicast addresses. If, however, the device determines that it should not continue to use the multicast addresses, the device clears its multicast addresses from memory. The device may then obtain new multicast addresses to communicate on the network.

The determination of whether the device should continue to use the multicast addresses may include a determination that the device is a mobile device. If the device is a mobile device, then it may clear the multicast addresses, regardless of whether it has actually been moved to a new location. The determination of whether the device should continue to use the multicast addresses may include a determination that the device has been moved to a location that has a different network.

According to an aspect, a method of controlling a medical device for transmitting and/or receiving at least one data stream through a medical network includes transmitting and/or receiving the at least one data stream over the medical network by a network interface of the medical device using at least one multicast address stored in a memory of the medical device. Upon powering up of the medical device after a power loss to the medical device, the method further includes disabling the network interface from transmitting and/or receiving the at least one data stream using the at least one multicast address stored in the memory. The method further includes determining whether to continue to use the at least one multicast address stored in the memory. In accordance with a determination to continue to use the at least one multicast address stored in the memory, the method further includes enabling the network interface such that the network interface can transmit and/or receive the at least one data stream using the at least one multicast address stored in the memory. In accordance with a determination not to continue to use the at least one multicast address stored in the memory, the method further includes clearing the at least one multicast address from the memory and enabling the network interface.

Optionally, the method further includes, upon being enabled after the at least one multicast address has been cleared, the network interface newly obtaining one or more multicast addresses.

Optionally, disabling the network interface from transmitting and/or receiving the at least one data stream using the at least one multicast address includes preventing the network interface from connecting to the medical network.

Optionally, disabling the network interface from transmitting and/or receiving the at least one data stream using the at least one multicast address includes preventing the network interface from fully booting.

Optionally, disabling the network interface from transmitting and/or receiving the at least one data stream using the at least one multicast address includes preventing the network interface from powering on.

Optionally, determining whether to continue to use the at least one multicast address includes determining whether the medical device is in a preselected category of medical devices, and the determination not to continue to use the at least one multicast address includes a determination that the medical device is in the preselected category of medical devices.

Optionally, the preselected category of medical devices includes mobile medical devices.

Optionally, determining whether the medical device is in the preselected category of medical devices includes accessing a stored setting.

Optionally, clearing the at least one multicast address from the memory includes resetting at least one setting of the network interface to a default value.

Optionally, determining whether to continue to use the at least one multicast address stored in the memory includes determining whether the medical device has moved to a new location relative to a location of the medical device prior to the power loss, and the determination not to continue to use the at least one multicast address stored in the memory includes a determination that the medical device has moved to the new location.

Optionally, determining whether the medical device has moved to the new location includes receiving location data identifying a current location of the medical device and comparing the current location to the location of the medical device prior to the power loss.

Optionally, the location data identifying the current location of the medical device is received via a communication channel that is not part of the medical network.

Optionally, the location data identifying the current location of the medical device is received via an electrical power supply connected to the medical device.

Optionally, the location data identifying the current location of the medical device is received via a mesh wireless network.

Optionally, the at least one data stream includes at least one of audio data and video data.

Optionally, transmitting and/or receiving the at least one data stream by the network interface includes encoding the at least one data stream for transmission through the medical network.

Optionally, transmitting and/or receiving the at least one data stream by the network interface includes decoding the at least one data stream received through the medical network.

According to an aspect, a medical device for transmitting and/or receiving at least one data stream through a medical network includes a network interface configured for transmitting and/or receiving the at least one data stream using at least one multicast address stored in first memory. The network device further includes a controller comprising one or more processors and second memory storing one or more programs for execution by the one or more processors. The one or more programs include instructions for causing the controller to disable the network interface from transmitting and/or receiving the at least one data stream using the at least one multicast address stored in the first memory. The programs further include instructions for causing the controller to determine whether to continue to use the at least one multicast address stored in the first memory. The programs further include instructions for causing the controller to, in accordance with a determination to continue to use the at least one multicast address stored in the first memory, enable the network interface such that the network interface can transmit and/or receive the at least one data stream using the at least one multicast address stored in the first memory. The programs further include instructions for causing the controller to, in accordance with a determination not to continue to use the at least one multicast address stored in the first memory, clear the at least one multicast address from the first memory and enable the network interface.

Optionally, the medical device further includes an encoder configured to convert data from a native data format to packetized data.

Optionally, the medical device further includes a decoder configured to convert packetized data to a native data format.

Optionally, the medical device is mobile.

Optionally, the medical device further includes a video and/or audio source or a video and/or audio sink.

Optionally, the network interface is further configured for newly obtaining one or more multicast addresses upon being enabled after the at least one multicast address has been cleared.

Optionally, disabling the network interface from transmitting and/or receiving the at least one data stream using the at least one multicast address includes preventing the network interface from connecting to the medical network.

Optionally, disabling the network interface from transmitting and/or receiving the at least one data stream using the at least one multicast address includes preventing the network interface from fully booting.

Optionally, disabling the network interface from transmitting and/or receiving the at least one data stream using the at least one multicast address includes preventing the network interface from powering on.

Optionally, determining whether to continue to use the at least one multicast address includes determining whether the medical device is in a preselected category of medical devices, and the determination not to continue to use the at least one multicast address includes a determination that the medical device is in the preselected category of medical devices.

Optionally, the preselected category of medical devices includes mobile medical devices.

Optionally, determining whether the medical device is in the preselected category of medical devices includes accessing a stored setting.

Optionally, clearing the at least one multicast address from the first memory includes resetting at least one setting of the network interface to a default value.

Optionally, determining whether to continue to use the at least one multicast address stored in the first memory includes determining whether the medical device has moved to a new location relative to a location of the medical device prior to a power loss, and the determination not to continue to use the at least one multicast address stored in the memory includes a determination that the medical device has moved to the new location.

Optionally, determining whether the medical device has moved to the new location includes receiving location data identifying a current location of the medical device and comparing the current location to the location of the medical device prior to the power loss.

Optionally, the location data identifying the current location of the medical device is received via a communication channel that is not part of the medical network.

Optionally, the location data identifying the current location of the medical device is received via an electrical power supply connected to the medical device.

Optionally, the location data identifying the current location of the medical device is received via a wireless network.

Optionally, the at least one data stream includes at least one of audio data and video data.

Optionally, the network interface transmitting and/or receiving the at least one data stream includes encoding the at least one data stream for transmission through the medical network.

Optionally, the network interface transmitting and/or receiving the at least one data stream includes decoding the at least one data stream received through the medical network.

According to an aspect, a non-transitory computer-readable storage medium stores software including instructions that when executed by a computing system cause the computing system to perform the method described above.

It will be appreciated that any of the variations, aspects, features, and options described in view of the systems apply equally to the methods and vice versa. It will also be clear that any one or more of the above variations, aspects, features, and options can be combined.

BRIEF DESCRIPTION OF THE FIGURES

The invention will now be described, by way of example only, with reference to the accompanying drawings, in which:

FIG. 3A illustrates a method for controlling how a medical device transmits and/or receives at least one data stream through a medical network in order to reduce multicast address conflicts.

FIG. 3B illustrates the method of FIG. 3A with an example of how the determination for whether to continue using the multicast addresses stored in memory may be made.

DETAILED DESCRIPTION

Figure 1:
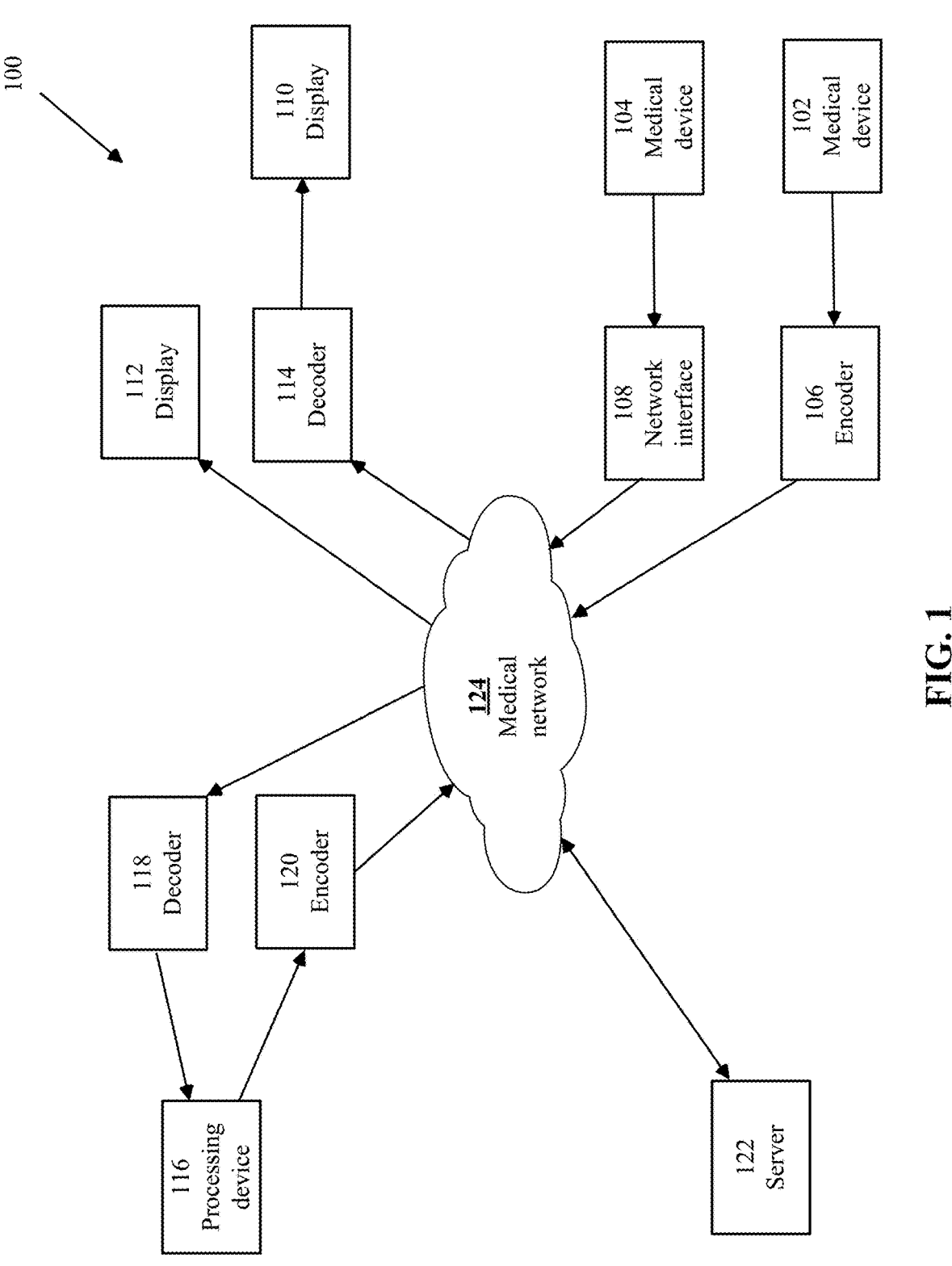
FIG. 1 illustrates an example system.

In the following description of the various examples, reference is made to the accompanying drawings, in which are shown, by way of illustration, specific examples that can be practiced. The description is presented to enable one of ordinary skill in the art to make and use the invention and is provided in the context of a patent application and its requirements. Various modifications to the described examples will be readily apparent to those persons skilled in the art and the generic principles herein may be applied to other examples. Thus, the present invention is not intended to be limited to the examples shown but is to be accorded the widest scope consistent with the principles and features described herein.

Systems, devices, and methods described herein include controlling how a medical device in an environment like a medical room may communicate on a network after a power loss (as used herein, a "medical device" is any device used in a medical facility, including devices used in treatment rooms, nurse's stations, imaging laboratories, or any other location in a medical facility). A medical facility, such as a medical room, may be associated with a network connecting medical devices in the medical room. A device that generates or produces data, such as a medical imaging system or a component thereof, may be associated with an encoder that converts data generated by the device from the device's native format to a format that may be transmitted on the network. A device that is a sink for or a consumer of data generated by other devices, such as a display that displays images generated by the medical imaging system or component thereof, may be associated with a decoder that converts data from the network format to the native format of the device. A device that is both a source and a sink may be both a producer and consumer of data, and may be associated with one or more encoders and one or more decoders.

Encoders and decoders may be associated with multicast addresses that define the network locations that data should be transmitted to and/or received from. An encoder may be assigned to multicast addresses that define the network locations where the data generated by its associated device should be transmitted. A decoder may be subscribed to multicast addresses that define the network locations from which data should be received. Multicast addresses may be stored in non-volatile memory associated with a given encoder or decoder such that the encoder or decoder can maintain its associations on the network after a power loss affecting the encoder or decoder.

To avoid a potential conflict arising from the wrong multicast addresses being used when a device and its associated encoder and/or decoder are moved to a new location that has a different network, the encoder and/or decoder are configured to determine whether to continue to use the multicast addresses to which it is assigned or subscribed. This determination may be made upon powering up after a power loss, such as after the device and its associated encoder and/or decoder have been unplugged and plugged back in again. If the determination is that the multicast addresses should continue to be used, then the encoder and/or decoder proceed with communicating on the network with those same multicast addresses. If the determination is that the multicast addresses should not be used, then the multicast addresses may be cleared. The encoder and/or decoder may then acquire new multicast addresses.

Determining whether to continue to use the multicast addresses may include determining whether the device associated with the encoder and/or decoder is in a preselected category of devices. If so, then the multicast addresses may be cleared each time the device powers up based on the assumption that the reason the device was likely powered off in the first place was so that the device could be moved to a new location that has a different network. If the device is not in the preselected category of devices, then its associated encoder and/or decoder may continue to use the multicast addresses based on the assumption that the power loss was unlikely to be associated with the device being moved to a new location having a different network. Determining whether to continue to use the multicast address may include determining that the device and/or its associated encoder and/or decoder have moved to a different location having a different network.

The encoder and/or decoder can include a network interface (e.g., a network interface card) that uses the multicast addresses to transmit and/or receive data through the network. Upon powering up of the encoder and/or decoder, a controller may prevent the network interface from communicating until the determination is made of whether to continue to use the currently assigned multicast addresses. If the determination is to not continue to use the multicast addresses, then the controller may clear the multicast addresses and then enable the network interface. If the determination is to continue to use the multicast addresses, then the controller may enable the network interface without clearing the multicast addresses.

In the following description of the various embodiments, it is to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may be specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor or may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present disclosure as described herein.

FIG. 1 illustrates an example system 100 for the present disclosure. The example system 100 may operate in a medical room environment and may include various devices that users (e.g., surgeons, medical staff, and the like) operate during a medical procedure. The various devices may either generate various data (i.e., the devices are data sources such as a medical imaging system or component thereof), receive various data (i.e., the devices are data sinks such as display equipment), or both (i.e., the devices are both data sources and data sinks). The various devices may be connected to a medical network 124 such that different kinds of data (such as video data, image data, audio data, measurement data, control data, among many others) from the data sources may be transmitted to the data sinks. The medical network 124 may be limited in range to cover a specific area, such as the medical room environment, but not extend beyond that. As such, the medical network 124 may be any appropriate type of network with a limited range, such as a local area network (LAN), virtual local area network (VLAN), or a Wireless Fidelity (WiFi) network.

Referring to FIG. 1, the system 100 may include a medical device 102. Medical device 102 may be any medical device that generates data, such as a medical imaging system or component thereof (for example, a C-arm fluoroscopic imager or an endoscopic imager), or may be any medical device that includes components for generating data, such as surgical light that includes an in-light camera. As such, medical device 102 is considered herein as a data source. The medical device 102 may be connected to an encoder 106 that takes the data in a native format (which may also be referred to as native data) generated by the medical device 102 and converts that data to a format that can be transmitted through the medical network 124. The format that the encoder 106 converts the data to may be any appropriate format that allows the converted data to be transmitted through the medical network. For example, the encoder 106 may convert the data from the native format to a series of packets that each include additional network transmission metadata, such as multicast addresses. Specifically, the encoder 106 may convert the data from the native format to a packetized form according to the communication protocol used by the interoperable medical devices connected to the medical network 124, such as the Internet Protocol (IP). In such cases, the encoder 106 may convert the native video data to IP packets that are then transmitted through the medical network.

While the medical device 102 may be connected to encoder 106 which may be a separate component from the medical device 102, the system 100 may include a medical device 104 that has an integrated encoder which is part of the medical device 104. As a result, conversion of the native data to the packetized format for transmission through the medical network 124 may be performed by the integrated encoder of the medical device 104. Similar to medical device 102, medical device 104 may be any medical device that generates data or any medical device that includes components for generating data.

It may also be noted that the medical devices 102 and 104 of system 100 may include any device that is present in the medical room environment that generates data that is transmitted through the medical network 124. Thus, for example, either of medical devices 102 and 104 may be a pan-tilt-zoom (PTZ) camera. While a PTZ camera may be used to generate additional medically relevant data, it may also be used to generate non-medical data, such as a video stream of the medical room. In either case, the data generated from the PTZ camera (which may be still images, video, and/or audio data) may be sent to an encoder to be converted from a native format to a packetized format that is able to be transmitted through the medical network 124. Alternatively, either of the medical devices 102 and 104 may be a keyboard, video, and mouse (KVM) source. A KVM source may be a workstation in the medical room environment that allows users (e.g., surgeons, medical staff, and the like) to control the various other devices in the medical room for a variety of purposes. For example, a camera may lose focus, but instead of directly adjusting the focus, which may compromise sterilization, the focus may be restored through the KVM source remotely. The data generated by the medical devices 102 and 104 may thus also be a variety of commands. The command data may then be sent to an encoder to be converted to a packetized format for transmission through the medical network 124.

After the native data from the medical devices 102 and 104 has been converted to a packetized format, the converted data may be transmitted through the medical network 124. Encoder 106 may include a network interface for transmitting data through the medical network 124. Medical device 104 may include an integrated network interface for transmitting data through the medical network 124. The network interface may be any appropriate component that is able to establish a connection to the medical network 124, which may depend on what type of network is used for medical network 124. For example, if the medical network 124 is a wired network, the network interface may be configured to transmit data on the wired network. Alternatively, if the medical network 124 is a WiFi network, the network interface may include a transceiver that generates and receives radio waves.

In addition to the data source devices described so far, the system 100 may also include various data sink devices. For example, the medical room environment may include displays 110 and 112 for displaying various types of data, such as user interfaces, images, and/or video feeds generated by one or more of the data sources, such as any combination of medical devices 102, 104, and 116 which is described further herein. The data source that the displays 110 and 112 receive data from may also be adjusted as necessary by the users (e.g., surgeons, medical staff, and the like) in the medical room environment. The display 110 may be configured to process data in a native format, which may correspond to the native format of the data generated by medical devices 102 and 104 or may be a different native format, but in either case, may differ from the packetized format that is used when transmitting data through the medical network 124. As such, the display 110 may be connected to a decoder 114 that converts the packetized data from the medical network 124 to the native format supported by the display 110, which may be a sequence of binary bits. On the other hand, the display 112 may have an integrated decoder as part of the display, and thus may not be connected to a separate decoder. Similar to the medical devices 102 and 104, the displays 110 and 112 may be associated with network interfaces that connect to the medical network 124 and receive data. A first network interface may be integrated into decoder 114, allowing the decoder 114 to connect to the medical network 124 and receive data. Alternatively, display 112 itself may include an integrated network interface, allowing the display 112 to connect to the medical network 124 and receive data. In this case, display 112 may include both an integrated decoder and an integrated network interface. However, the network interface may also be a separate component from either or both a decoder and the decoder's corresponding display. The displays 110 and 112 may also be any device capable of receiving data, which may include but is not limited to a recorder, a speaker, a printer, a monitor, a projector, a headset, or a USB extension hub, among many others.

The system 100 may also include an image processing device 116, which may transmit and receive data through the medical network 124, and may thus be a data source and data sink. Similar to the display 110, the image processing device 116 may be connected to a decoder 118 that converts the data from a packetized format to a native format supported by the image processing device 116. The decoder 118 may include an integrated network interface that allows the decoder 118 to connect to the medical network 124 and receive data. The image processing device 116 may also be connected to an encoder 120 that converts the data from a native format to a packetized format for transmission through the medical network 124, similar to the medical device 102. The encoder 120 may also include an integrated network interface that allows the encoder 120 to connect to the medical network 124 and transmit data. The image processing device 116 may be configured to process the data from a data source, such as by increasing the resolution in imaging or video data, before the data is received by a data sink. For example, medical device 102 may generate video data that is converted by encoder 106 and transmitted through the medical network 124. That data may then be received at decoder 118 and converted to a native format for the image processing device 116. The processing device 116 may then process the video data generated by the medical device 102 before the encoder 120 converts the processed data and transmits it through the network 124. The processed data may then finally be received by display 110 through the decoder 114. The image processing device 116, as well as one or more of the devices 102, 104, 110, and 112, may also be connected to a series of control cables that may allow the processing device 116 to be remotely controlled, either from the same environment in which the device is located or from another separate location. The devices 102, 104, 110, 112 and/or the image processing device 116 may also be controlled through information or commands that are transmitted across the medical network 124, instead of or in addition to a series of control cables.

In transmitting and receiving data through the medical network 124, the network interfaces associated with the various devices may be associated with one or more multicast addresses on the medical network 124. Specifically, the network interfaces for the data source devices may be assigned one or more multicast addresses to transmit data to, while the network interfaces for the data sink devices may be subscribed to one or more multicast addresses to receive data from. For example, the network interface of medical device 104 may be assigned two multicast addresses $a_1$ and $a_2$. Data generated by the medical device 104 may then be transmitted to those two multicast addresses via the network interface of medical device 104. There may be additional multicast addresses $a_3$-$a_5$ that the network interfaces for other data source devices like the medical device 102 may be assigned to, but the network interface of medical device 104 may not transmit to those addresses since it is not assigned to them. On the other hand, the network interface for data sink devices such as display 112 may be subscribed to multicast addresses $a_1$ and $a_2$. As a result, the display 112 may receive the data that is transmitted to those addresses by the corresponding data source devices. In this case, the display 112 may receive the data generated by the medical device 104. The multicast addresses, associations of network interfaces to the multicast addresses, and the operations to route data through the multicast addresses may all be managed by a server 122. Specifically, while the users (e.g., surgeons, medical staff, and the like) in the medical room environment may specify that certain data source devices should be connected to certain data sink devices, the server 122 may handle assigning and subscribing the network interfaces for the relevant devices to the correct multicast addresses such that data from the data source devices may be received by the data sink devices. The server may be centralized or distributed, and may be co-located with the devices or in a separate environment. As mentioned above, the medical network 124 may cover a specific area, such as a particular medical room environment, but not extend beyond that. As such, different medical room environments may be associated with different medical networks, such as different medical networks covering different groups of medical room environments or each medical network covering a respective medical room environment but not extending beyond that. In cases with multiple medical networks for different environments, there may also be a different server 122 associated with each of the medical networks.

Since the network interfaces for data source devices and data sink devices may maintain their associations to multicast addresses unless their assigned or subscribed multicast addresses are intentionally changed by a user (e.g., surgeon, medical staff, and the like), routes between data source devices and data sink devices may be maintained for extended periods of time unless multicast address associations are intentionally changed. This may mean that routes are maintained even for device disconnections followed by reconnections to the medical network as well as a power loss followed by a restoration of power. However, this may result in multicast address conflicts if the network interfaces are configured with multicast addresses in the context of a first medical network but are then moved along with their corresponding device into a second medical network that is different from the first, which may arise in the case of mobile devices. When the network interface for a device subsequently begins operating in the second medical network, multicast address conflicts may occur since the addresses that the network interface was configured with from the first network may be different in the second network. For example, a network interface for a data sink device d may be subscribed to a set of multicast address $a_1$ in a first medical network. When the data sink device d is then moved to a second medical network, the network interface for the data sink device d may still be subscribed to the same multicast address $a_1$, except the address $a_1$ is now the one on the second medical network. However, the corresponding data source device for address $a_1$ on the second medical network may be one that the data sink device d is not intended to receive data from; or it may be the case that there are already a large number network interfaces of other data sink devices already subscribed to address $a_1$ on the second medical network where the addition of the network interface for data sink device d results in oversubscription to address $a_1$ on the second medical network. The process described further herein may help reduce such multicast address conflicts.

Figure 2:
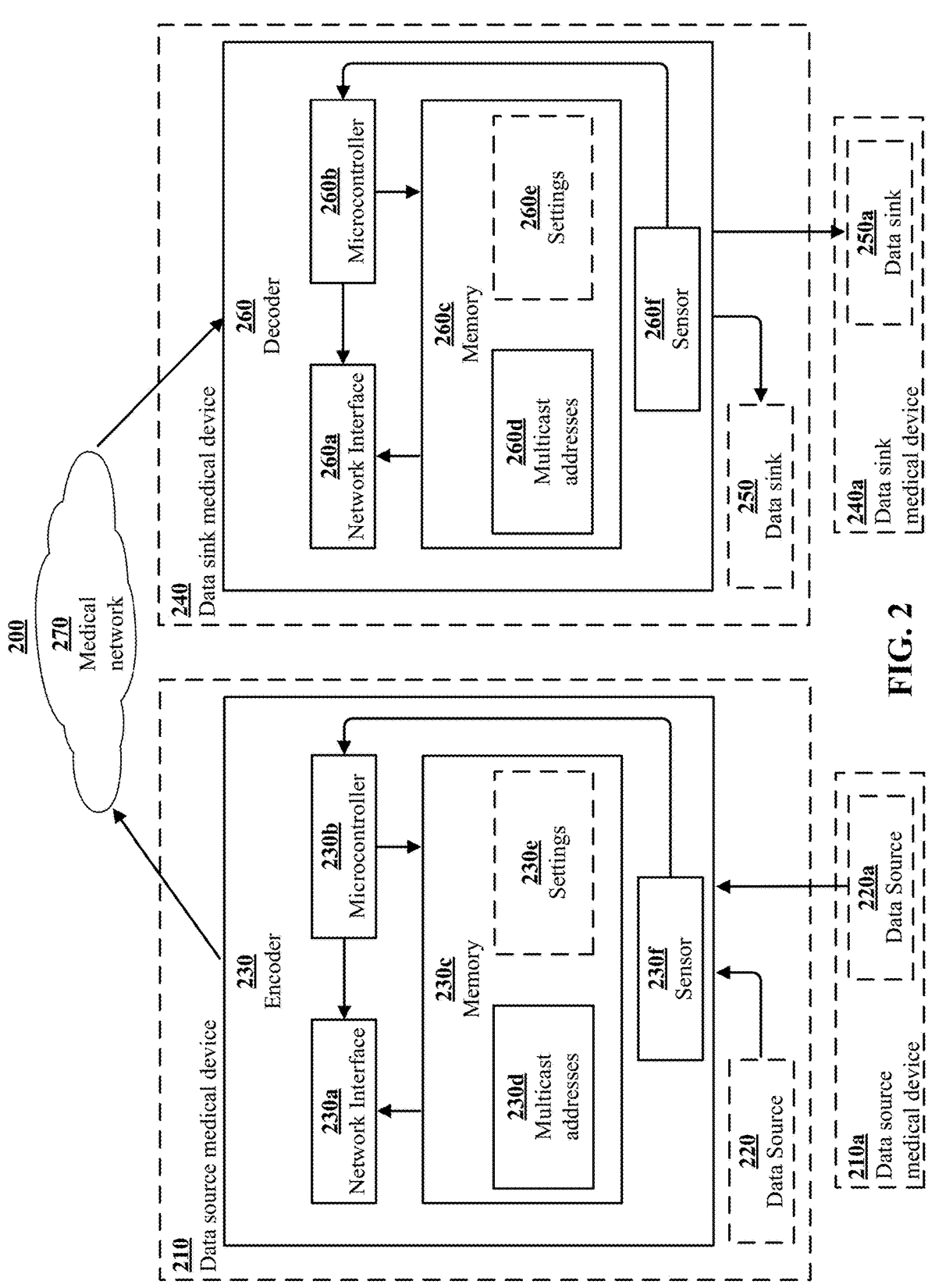
FIG. 2 illustrates a schematic of a medical device that may transmit or receive data over a medical network.

FIG. 2 illustrates a schematic of an exemplary system 200 to transmit and/or receive data over a medical network. The system 200 may include a data source medical device 210 for generating data to be transmitted over a medical network 270. The data source medical device 210 may include a data source 220 that may be any component capable of generating data, such as an endoscopic camera that generates video data. The data source medical device 210 may also include an encoder 230 connected to medical network 270. FIG. 2 illustrates the encoder 230 incorporated into the data source medical device 210. However, the encoder 230 may be a separate component that is not incorporated into a medical device. For example, the encoder 230 may instead be connected to a separate data source medical device 210a and may receive data from that device's data source 220a. In other words, the encoder 230 may either be incorporated into a data source medical device 210 or may be a component that is connected to a separate data source medical device 210a that receives data from the data source 220a of that separate medical device 210a. In cases where the encoder 230 is a separate component, the encoder 230 may be connected to the data source medical device 210a via a suitable link, such as video cable.

The system 200 may include a data sink medical device 240 for receiving data from the medical network 270. The data sink medical device 240 may include a data sink 250 that may be any component capable of receiving data, such as a display. The data sink medical device 240 may include a decoder 260 connected to the medical network 270. Similar to the encoder 230, FIG. 2 illustrates the decoder 260 incorporated into the data sink medical device 240. However, the decoder 260 may also be a separate component that is not incorporated into a medical device but instead is connected to a separate data sink medical device 240a to transmit data to that device's data sink 250a. In other words, the decoder 260 may either be incorporated into a data sink medical device 240 or a component that is connected to a separate data sink medical device 240a that transmits data to the data sink 250a of that separate medical device 240a. In cases where the decoder 260 is a separate component, the decoder 260 may also be connected to the data sink medical device 240 via a suitable link, such as a video cable.

A medical device may be both a data source and a data sink. For example, an image processing system may be a data sink for images generated by an imaging system, may process those images, such as to enhance the images, and may be a data source for a display to display the processed images. Such a medical device may incorporate the encoder 230 and/or decoder 260 or may be separately connected to the encoder 230 and/or decoder 260.

The present disclosure may be described from the perspective of the data source medical device 210 incorporating the encoder 230 and the data sink medical device 240 incorporating the decoder 260, but the disclosure may apply equally when the encoder 230 is instead a separate component connected to the data source medical device 210a and/or when the decoder 260 is a separate component connected to the data sink medical device 240a. When the encoder 230 and decoder 260 are incorporated into the data source 210 and data sink 240 medical devices, respectively, the medical devices may consequently incorporate the various components of the encoder/decoder, which are described further below.

The encoder 230 may receive data in a native format from the data source 220 and convert that data to a different format capable of being transmitted through the medical network 270. For example, the encoder 230 may receive data as a sequence of bits from the data source 220 and convert that data to a series of packets to be transmitted through the medical network 270. As such, the encoder 230 may integrate various hardware components involved in the conversion and transmission functionalities, such as a Central Processing Unit (CPU), Random Access Memory (RAM), network cables, or wireless network adapters. Alternatively, the encoder 230 may be any type of processing unit capable of receiving data from the data source 220, converting the data from a native format to a format transmittable through the medical network 270, and transmitting the converted data through the medical network 270. The encoder 230 may also convert between various different formats as appropriate for the specific application.

The decoder 260 may connect to the medical network 270 to receive data in a format used by the medical network 270 and then convert the data to a native format supported by the data sink 250 before sending the converted data to the data sink 250. For example, the decoder 260 may receive data in a packetized format which is used to transmit data through the medical network 270 and convert that packetized data to a sequence of binary bits that is supported by the data sink 250. As such, the decoder 260 may integrate various hardware components involved in the reception and conversion functionalities, such as a CPU, RAM, network cables, or wireless network adapters, but may also be any processing unit capable of receiving data and transmitting the converted data to the data sink 250. The decoder 260 may also convert between various other formats as appropriate.

The encoder 230 and/or decoder 260 may each include a network interface that connects to the medical network 270 to transmit and receive data. For example, the encoder 230 may include a network interface 230a that connects to the medical network 270 and transmits the converted data to various multicast addresses on the medical network 270. The decoder 260 may similarly include a network interface 260a that connects to the medical network 270 and receives converted data from various multicast addresses on the medical network 270. The network interfaces 230a and 260a may be any processing unit capable of transmitting data to and/or receiving data from the medical network 270, such as an application specific integrated circuit (ASIC) or field programmable gate array (FPGA).

The encoder 230 and/or decoder 260 may also each include a microcontroller that controls the network interfaces 230a and 260a. The encoder 230 may include a microcontroller 230b that controls the encoder network interface 230a, while the decoder 260 may include a microcontroller 260b that controls the decoder network interface 260a. The microcontrollers 230b and 260b may include various machine executable instructions for executing actions with respect to the network interfaces 230a and 260a in order to reduce potential multicast address conflicts when the network interfaces 230a and 260a connect to the medical network 270, as described above with respect to FIG. 1. Specifically, this may include controlling the multicast addresses that the encoder network interface 230a is assigned to transmit data to and the multicast addresses that the decoder network interface 260a is subscribed to receive data from. The microcontrollers 230b and 260b may also execute actions to control the boot up process of the network interfaces 230a and 260a, the encoder 230 and decoder 260, and/or the data source 210 and data sink 240 medical devices. For example, the microcontrollers 230b and 260b may execute actions that interrupt a normal booting process for the encoder 230 and decoder 260 as part of controlling the network interfaces 230a and 260a. The microcontrollers 230b and 260b may also interface with the memory 230c and 260c of the encoder 230 and decoder 260, respectively, to adjust the multicast addresses that the network interfaces 230a and 260a are associated with. Although microcontrollers 230b and 260b are illustrated, the encoder 230 and/or decoder 260 may instead or additionally include any computing device that has an I²C interface and/or Ethernet interface and is capable of controlling the multicast addresses that the network interfaces 230a and 260a transmit data to and receive data from, such as embedded compute boards, FPGAs or ASICs with integrated microcontrollers, or various different CPUs, among many others.

The encoder 230 may store the multicast addresses 230d in a memory 230c that the encoder 230 has been assigned to transmit data to. Since the associations to the multicast addresses 230d may be maintained during power losses, the memory 230c may be a non-volatile memory that persists through power losses. When the encoder network interface 230a connects to the medical network 270, it may read from the memory 230c to determine the multicast addresses it is currently assigned to transmit data to. As such, the microcontroller 230b may interface with memory 230c to adjust the multicast addresses that are read by the encoder network interface 230a. The memory 230c may also include various settings 230e that may be updated by the microcontroller 230b when the microcontroller 230b controls the network interface 230a to reduce potential multicast address conflicts. Some of the settings 230e may relate to the multicast addresses 230d, and thus may be updated in various ways when the multicast addresses 230d that the encoder is associated with are adjusted. However, other sections of the settings 230e may not relate to the multicast addresses 230d and thus may remain unchanged even when the multicast addresses 230d are adjusted.

The decoder 260 may similarly include a memory 260c that stores the multicast addresses 260d that the decoder 260, and by extension the network interface 260a, is subscribed to receive data from. The memory 260c may also be non-volatile memory that persists through power losses, and the decoder network interface 260a may read from the memory 260c to determine the multicast addresses 260d it is subscribed to when connecting to the medical network 270. As such, the microcontroller 260b may interface with memory 260c to adjust the multicast addresses 260d that are read by the decoder network interface 260a. The settings 260e in the memory 260c may also be similar to the settings 230e, where some relate to the multicast addresses 260d and thus may be adjusted by the microcontroller 260b when the microcontroller 260b controls the network interface 260a to reduce potential multicast address conflicts.

The encoder 230 and decoder 260 may also include sensors 230f and 260f, respectively, for detecting certain aspects of the environment that the encoder 230 or decoder 260 is located in. The sensors 230f and 260f may be various types of sensors that are configured to detect different aspects of the environment. For example, the sensors 230f and 260f may be radio wave sensors for detecting radio waves or light sensors for detecting specific ranges of a light spectrum, which are described further below with respect to FIG. 4B. Data corresponding to the detected aspects of the environment may then be forwarded to the microcontrollers 230b and 260b as additional factors in controlling the multicast addresses that the network interface 230a is assigned to transmit data to and the network interface 260a is subscribed to receive data from.

Although the system 200 is illustrated with the different devices and components in a particular configuration, various other configurations may also be appropriate. For example, the data source medical device 210 may include both the data source 220 and a data sink, such as one similar to data sink 250 or 250a. In such cases, the data source medical device may also include a decoder, such as one similar to decoder 260, to convert data received from the medical network 270 into a format supported by that data sink that is now included in the data source medical device 210. The network interface 230a may then be configured to both transmit data to the medical network 270 as well as receive data from the medical network 270. The multicast addresses 230d may also include those that the network interface 230a is assigned to transmit data to and those that the network interface 230a is subscribed to receive data from. Separate network interfaces may also be provided for the encoder and decoder. For example, the data source medical device 210 may include the network interface 230a associated with the encoder 230, but also include another network interface, such as one similar to the network interface 260a, that is associated with the decoder. This may also mean the memory 230c of the data source medical device 210 stores two sets of multicast addresses: the multicast addresses 230d that the network interface 230a associated with the encoder 230 may be assigned to transmit data to, as well as the multicast addresses 260d that the network interface 260a associated with the decoder may be subscribed to receive data from.

The encoder 230 and decoder 260 may also only include functionality for converting data between a native and packetized formats, with the components currently illustrated as part of the encoder 230 and decoder 260 instead being separate from the encoder/decoder. In other words, one or more of the network interfaces, microcontrollers, memories and sensors may be separate from the encoder 230 and decoder 260. The encoder/decoder components in such cases may remain incorporated into the data source 210 and data sink 240 medical devices, but may not be incorporated into the encoder 230 or decoder 260.

Referring back to the configuration depicted in system 200, the encoder 230 and decoder 260 may also include multiple instances of the microcontrollers 230b and 260b, respectively, and/or multiple instances of the sensors 230f and 260f, respectively. The microcontrollers 230b and 260b may also be integrated into the network interfaces 230a and 260a, respectively. The memory 230c and 260c may also be integrated into the network interfaces 230a and 260a, respectively. More generally, the encoder 230 and decoder 260, the network interfaces 230a and 260a, the microcontrollers 230b and 260b, the memory 230c and 260c, and the sensors 230f and 260f may be in any configuration combination of being an integrated component of the data source 210 and data sink 240 medical devices, separate from the medical devices 210 and 240 but integrated components of one another, or all completely separate components from one another and the medical devices 210 and 240.

FIG. 3A illustrates a method 300 for controlling how a medical device transmits and/or receives at least one data stream through a medical network in order to reduce multicast address conflicts. Various steps of the method 300 may be executed by the encoder and/or decoder of FIG. 2. The method 300 may include step 310 where an encoder/decoder network interface, such as 230a or 260a of FIG. 2, transmits and/or receives a data stream over a medical network using a multicast address stored in memory. The data stream may be video and/or audio data that was generated by a data source, such as data source 220 of FIG. 2, and subsequently transmitted through a medical network, or the data stream may be video and/or audio data that was received through the medical network and sent to a data sink, such as data sink 250 of FIG. 2. Transmitting the data stream may also include converting the data from a native format supported by a data source to the format for the medical network (which may also be considered encoding the data stream), and similarly, receiving the data stream may include converting the data from the format of the medical network to a native format supported by a data sink (which may also be considered decoding the data stream). In transmitting the data stream over the network, the encoder network interface may transmit the data to the multicast addresses that it was assigned to. Similarly, the decoder network interface may receive data from the multicast addresses that it has subscribed to. Because the method 300 may be applied in a similar manner to the network interface for both an encoder and a decoder, the reference to a network interface in the description for method 300 may be applicable to both an encoder and decoder network interface.

The multicast addresses for a network interface may be stored in a non-volatile section of memory such that the network interface may retrieve the multicast addresses and remain associated with their respective multicast addresses even if the medical device experiences a power cycle (a power outage followed by power being restored). However, various changes may take place while the medical device is without power. For example, the medical device, and its associated encoder and/or decoder, may be moved to a new medical room environment within a medical facility. This move may result in the network interface of the encoder and/or decoder losing a connection to a medical network of the previous medical room environment and connecting to a different medical network of the new medical room environment once a connection is established. As mentioned above, connection to a different medical network may cause multicast address conflicts since the multicast addresses that the network interface was previously associated with (e.g., before the power loss) may be directed to different data sources and/or data sinks than multicast addresses associated with the different medical network of the new medical room environment. Thus, steps 320 through 350 of method 300 may be executed after the medical device and network interface power up after a power loss. The steps in method 300, as well as subsequent methods in later figures, may be described from the perspective of a power loss.

At step 320, upon powering up the medical device after a power loss to the medical device, a microcontroller (e.g., disposed within encoder 230 or decoder 260 shown in FIG. 2) connected to the network interface may disable the network interface from connecting to the medical network and transmitting and/or receiving the data stream using the multicast addresses stored in memory (e.g., the multicast addresses 230d/260d stored in memory 230c/260c shown in FIG. 2). Although it may be the case that the medical network that the network interface will connect to has not changed since the power loss, the network interface may be disabled nonetheless in order to prevent multicast address conflicts in case the medical network has changed since the power loss. The microcontroller disabling the network interface may be understood as preventing the network interface from connecting to the medical network as that may be sufficient to prevent multicast address conflicts, and thus may not include disabling the network interface such that the network interface is made completely inoperative. As such, disabling the network interface at step 320 may be done in various different manners, described further below.

The microcontroller may enable the network interface to be powered up but prevent the network interface from connecting to the medical network. This may include the microcontroller taking different actions that may depend on a variety of factors. For example, if the medical network is a WiFi network, the microcontroller may allow the network interface to power up but may control the network interface such that the network interface does not activate an antenna, or other radio wave emitting component, within the network interface to prevent the network interface from communicating with, or otherwise connecting to, the medical network. In yet another example, the microcontroller may prevent the network interface from powering on at all at step 320. In this example, the network interface may receive power once the microcontroller makes a determination that the multicast addresses stored in memory will not cause any multicast address conflicts to occur on the medical network.

At step 330, the microcontroller for a medical device may determine whether to continue to use the multicast addresses currently stored in memory, which may be accomplished in various ways. For example, the determination may be based on a setting that indicates whether the medical device is in a preselected category of devices, such as mobile medical devices. Specifically, a value stored in a register in the memory of the medical device may function as a flag to indicate whether the medical device is in the preselected category of devices. Different values for the register may be pre-defined to indicate whether the flag is set, such as the value 1 being stored in the register to indicate the flag is set and that the medical device is in the preselected category of devices and the value 0 to indicate the flag is not set and that the medical device is not in the preselected category. The microcontroller may then read the value in the register to determine whether the flag has been set and as a result, whether the medical device is in the preselected category of devices. The medical device being in the preselected category may result in a determination to not continue using the multicast addresses stored in memory, whereas the medical device not being in the preselected category may result in a determination to continue using the multicast addresses. The setting indicating whether the medical device is in the preselected category of devices may also apply to multiple categories of devices. Specifically, the register may store a range of values with each value representing a different category or set of categories, which may allow the microcontroller to determine if the medical device is in any number of categories of devices and/or if the medical device is simultaneously in multiple categories of devices. Alternatively, the microcontroller may receive data from a communication channel separate from the medical network that indicates another aspect of the medical device, such as its location, that may be used to make the determination of whether to continue using the multicast addresses stored in memory. These approaches are described in more detail further herein.

However, many other approaches may be taken to determine whether the network interface should continue to transmit and/or receive data using the multicast addresses stored in memory. For example, the microcontroller may measure an amount of time that elapses between the loss of power and the restoration of power, and make the determination based on whether the elapsed time meets, or exceeds, a predetermined threshold amount of time. This approach may be taken if any changes that may lead to multicast address conflicts require a certain amount of time to elapse. The predetermined threshold amount of time that such changes may require may be stored in the memory of the medical device, and the microcontroller may compare the elapsed time between loss and restoration of power to that predetermined threshold amount time to determine whether to continue using the multicast addresses stored in memory.

As described above with respect to FIG. 2, the medical device may also include a set of sensors (e.g., sensors 230f and 260f) for detecting certain aspects of the medical device's environment. The microcontroller may receive data from the sensors and, if the data differs from the corresponding data for the environment before the power loss, the microcontroller may determine that the network interface continuing to use the multicast addresses stored in memory will likely lead to multicast address conflicts. For example, the sensors may be light sensors that detect the light frequencies in the medical device's current medical room environment. Different environments that the medical device may be located in may have different light frequencies, and if the light frequency of the current location differs from the light frequency detected before the power loss, the microcontroller may determine that the medical device has moved to a new medical room environment. The new medical room environment may be associated with a different medical network and thus the microcontroller may determine that the network interface continuing to use the multicast addresses stored in memory will likely lead to multicast address conflicts. This approach may be taken where different environments for the medical device and network interface correspond to different medical networks.

The microcontroller may receive user input indicating that the network interface should not continue to use the multicast addresses stored in memory. The user input may be received in many different forms, such as an input that interrupts normal rebooting of the medical device to indicate to the microcontroller that the multicast addresses stored in memory should not be used, an input including data that the microcontroller may use to make the determination, or an input directly specifying whether to continue using the multicast addresses stored in memory, among many others. The microcontroller may analyze the input and then make the determination based on the analysis. For example, if the microcontroller detects the input for interrupting normal rebooting of the medical device, the microcontroller may infer that the multicast addresses stored in memory should not be used. In cases where the user input directly specifies whether to continue using the multicast addresses stored in memory, the microcontroller may make the determination directly based on the content, presence, or absence of that user input. For example, the content of the user input may specify that the network interface should continue using the stored multicast addresses, the presence of any such user input may indicate that the network interface should continue using the stored multicast addresses, and the absence of any such user input may indicate that the network interface should not continue using the stored multicast addresses. The microcontroller may also receive data from a remote source instead of user input, where the data from the remote source may also be analyzed to make the determination on whether to continue using the multicast addresses stored in memory. The remote source may be or include various entities, such as a network administrator, medical staff, trusted third-party vendor, and the like. For example, the remote source may provide data to the microcontroller using a different network from the medical network indicating that the multicast addresses stored in memory are no longer valid and require updating to avoid multicast address conflicts. In another example, the remote source may provide a broadcasting beacon (e.g., a Bluetooth beacon) that broadcasts the data to any medical device in range to detect it, which is discussed further herein with respect to FIG. 4B. Additional approaches for making the determination are also discussed further herein.

If the microcontroller of the medical device determines that the network interface should continue to use the multicast addresses stored in memory, method 300 may proceed to step 340 where the microcontroller may enable the network interface to transmit and/or receive a data stream through the medical network using the multicast addresses stored in memory. In other words, the network interface may resume transmitting data using the multicast addresses assigned to an encoder network interface or resume receiving data using the multicast addresses subscribed to by a decoder network interface. Enabling the network interface may include performing different operations depending on how the network interface was disabled at step 320. For example, if the network interface had been powered up but the microcontroller had prevented the network interface from connecting to the medical network, such as by restricting transmission of radio waves to a WiFi medical network, the microcontroller at step 340 may enable the network interface to fully connect to the medical network. If instead the network interface was prevented from powering on at all at step 320, the microcontroller at step 340 may allow the network interface to become powered on and connect to the medical network accordingly.

If the microcontroller at step 330 determines that the network interface should not continue using the multicast addresses stored in memory, the method 300 may proceed to step 350 from step 330 where the microcontroller may clear the multicast address from memory and then enable the network interface. Clearing the multicast addresses may allow the network interface to disassociate with the stored multicast addresses in order to prevent multicast address conflicts when the network interface subsequently connects to the medical network. The multicast addresses may be completely removed from memory such that an encoder network interface is no longer assigned to transmit data to those multicast addresses and a decoder network interface is no longer subscribed to receive data from those multicast addresses. The addresses may be cleared from memory in different ways, with some example approaches discussed further herein. Once the multicast addresses have been cleared from memory, the network interface may be enabled to connect to the medical network and may obtain new multicast addresses from the network.

FIG. 3B illustrates the method 300 for controlling how a medical device transmits and/or receives a data stream through a medical network with an example of how the determination for whether to continue using the multicast addresses stored in memory may be made. As described above with respect to FIG. 3A, method 300 may include step 310 where the network interface for a medical device may transmit and/or receive a data stream over a medical network using multicast addresses stored in the memory of the medical device. Upon powering up the medical device after a power loss, at step 320, a microcontroller may disable the network interface from connecting to the medical network and transmitting and/or receiving the data stream using the multicast addresses stored in memory.

At step 330, the microcontroller of the medical device may determine whether the network interface should continue to use the multicast addresses stored in memory. A few potential approaches were described above, but the determination may include step 332 where the microcontroller may determine whether the medical device is in a preselected category of devices, where that determination may then be used to determine whether the network interface of the medical device should continue to use the multicast addresses stored in memory. The medical device being in the preselected category of device may mean the network interface should continue to use the multicast addresses stored in memory, but it may also mean the network interface should not continue to use the multicast addresses. Additionally, it may be understood that step 332 may include determining whether the medical device is in more than one preselected category. In this case, the medical device's membership in a group of preselected categories may be considered in determining whether to continue using the multicast addresses stored in memory at step 330, but the present disclosure may be described with respect to a single preselected category, which may apply equally to each category in a group of categories.

One potential category of devices may be mobile medical devices, and thus the determination at step 332 may include determining whether the medical device is a mobile medical device at step 334. Determining that the medical device is a mobile medical device may be done in various ways, such as by accessing a stored setting from the memory of the medical device. The stored setting may have been configured when the medical device was initially set up and stored in non-volatile memory so that the setting persists through power losses. The stored setting may also be user configurable such that it may be updated after being initially set to an initial value. Thus, the stored setting may initially be configured to indicate the medical device is a mobile medical device but may be updated at a later time to instead indicate that the medical device is no longer a mobile medical device. Devices belonging to this category may mean the network interface should not use multicast addresses stored in memory upon the medical device powering up after a power loss. Since mobile medical devices may be frequently moved from one medical room environment to another, it may be the case that a medical device in this category is more likely to cause multicast address conflicts when the network interface for the medical device reconnects to the medical network after the power loss. Thus, in this case, a determination that the medical device is part of the preselected category may result in a determination to not continue to use the multicast addresses stored in memory. On the other hand, the preselected category of devices may be stationary medical devices, and determining that the medical device is a stationary medical device may mean that the network interface should continue to use the multicast addresses stored in memory since medical devices in this category may be assumed to be more likely to have remained unchanged through power losses and would not cause multicast address conflicts when the network interface reconnects to the medical network. Thus, in this case, a determination that the medical device is part of the preselected category may instead result in a determination to continue to use the multicast addresses stored in memory.

Another potential category of devices may be medical devices with an integrated encoder or decoder, where the determination at step 332 includes determining whether the medical device has an integrated encoder or decoder, which may also be done in various ways, such as by accessing a stored setting in the memory of the medical device that indicates whether the medical device has an integrated encoder or decoder. Medical devices with an integrated encoder and/or decoder may themselves be moved to a new location, such as to a new medical room environment, during a power loss and thus may reconnect to a new medical network upon powering up. The stored setting may be initially set by the medical device's manufacturer, but may also be updated at a later time if the medical device is altered, either when an encoder or decoder is integrated into the medical device, or if an originally integrated encoder or decoder is removed from the medical device. The stored setting may also be updated in various ways, such as through a centralized operations, administration, maintenance, and provisioning (OAMP) system.

Using the determinations made at steps 332 and 334, the microcontroller may determine whether the medical device's network interface should continue to use the multicast addresses stored in memory at step 330. If the microcontroller determines that the network interface should continue to use the multicast addresses stored in memory, method 300 may proceed to step 340 where the microcontroller may enable the network interface to transmit and receive a data stream through the medical network using the multicast addresses stored in memory, as described above with respect to step 340 of FIG. 3A. If instead the microcontroller determines that the network interface should not continue using the multicast addresses stored in memory, the method 300 may proceed to step 350 from step 330 where the microcontroller may clear the multicast address from memory and then enable the network interface, as described above with respect to step 350 of FIG. 3A.

Figure 4A:
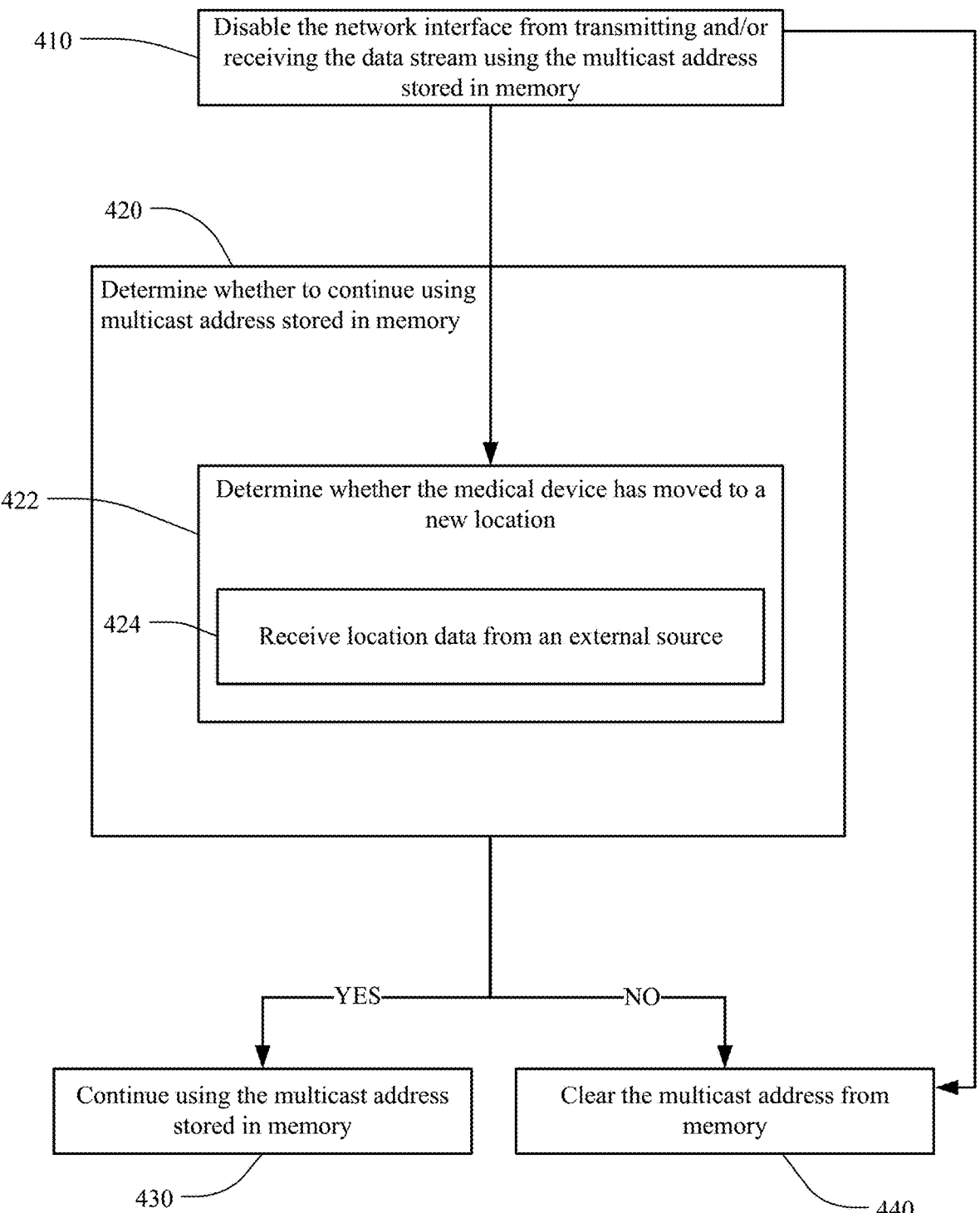
FIG. 4A illustrates a method for controlling how a medical device reconnects to a medical network upon powering up after a power loss.

FIG. 4A illustrates a method 400 for controlling how a medical device reconnects to a medical network upon powering up after a power loss. Various steps of method 400 may correspond with the steps in method 300 as described above with respect to FIGS. 3A and 3B. The method 400 may include step 410 after a medical device powers up after a power loss, where a microcontroller for the medical device may disable the network interface of the medical device from connecting to the medical network and transmitting and/or receiving a data stream using the multicast addresses stored in the medical device's memory. Step 410 of method 400 may correspond with step 320 of method 300.

After the network interface has been disabled, method 400 may proceed to step 420 to determine whether the network interface should continue using the multicast addresses stored in the medical device's memory. This determination may include determining whether the medical device has moved to a new location relative to a location of the medical device prior to the power loss at step 422. The determination of whether the medical device has moved to a new location may then inform the determination of whether the network interface should continue using the multicast addresses stored in memory. This approach may be taken because the medical device moving to a new location may result in the network interface causing multicast address conflicts when reconnecting to the medical network. For example, and referring back to the example of FIG. 1, the medical network that the network interface connected to prior to the power loss may be a limited range network that covered a specific area, such as a particular medical room environment, but did not extend beyond that. During the power loss (e.g., when the medical device is unplugged so that it can be moved), the medical device may have been moved to a different medical room environment with a different medical network. When the medical device's network interface is re-enabled, it may now connect to the new medical network associated with the different medical room environment rather than the medical network for the medical room environment in which the medical device was previously located. As a result, the network interface may experience multicast address conflicts if it continues to use the multicast addresses stored in memory, which may be associated with different data sources and/or data sinks between the two medical networks. The medical device's microcontroller may thus determine whether the medical device has been moved to a new location at step 422 in order to prevent multicast address conflicts. A determination that the medical device has moved to a new location may then result in a determination that the network interface should not continue using the multicast addresses stored in memory.

To make the determination, the microcontroller for the medical device may receive information indicative of its current location from an external source at step 424. Receiving the location data may be accomplished in different ways, with example approaches described further herein. The microcontroller may then analyze the medical device's current location data to determine whether the medical device has moved to a new location. For example, the current location data may be compared against previous location data stored in the non-volatile memory of the medical device, and a difference between the two sets of location data may indicate that the medical device has moved to a new location. The difference between the two sets of location data may also need to meet a predefined condition before the microcontroller determines that the medical device has moved to a new location, as a particular location may encompass a range of location data. For example, a location such as a medical room environment may encompass and be represented by all of the location data within the area of the medical room environment. As a result, the new location data may need to be outside the range of location data for the area of the medical room environment for the microcontroller to determine that the medical device has moved to a new location. As another example, a medical network may encompass multiple medical rooms and any location data within the area of any of those medical rooms may correspond to that one medical network. As a result, the new location data may need to be outside the range of location data for any of those medical rooms for the microcontroller to determine that the medical device has moved to a new location.

Alternatively, the medical device's memory may store associations between different location data ranges and specific medical networks. For example, a first set of location data ranges may be associated with a first medical network while a second set of location data ranges may be associated with a second medical network. The medical device's microcontroller may then compare the current location data received at step 424 against the stored associations to determine which medical network the medical device is associated with based on its current location. If the medical network for the current location differs from the medical network that the medical device's network interface was previously connected to, that may result in a determination that the medical device has been moved to a new location. While some examples of how the determination that the medical device has moved to a new location are described, many other approaches may be appropriate. Step 420 may correspond with step 330 of method 300.

If the microcontroller of the medical device determines that the medical device is in the same location as prior to the power loss and, therefore, the network interface should continue to use the multicast addresses stored in memory, method 400 may proceed to step 430 where the microcontroller may enable the network interface to transmit and receive a data stream through the medical network using the multicast addresses stored in memory. By continuing to use the multicast addresses stored in memory, the network interface may avoid having to perform various operations associated with being assigned to and/or subscribing to new multicast addresses, such as clearing the multicast addresses from memory before receiving new multicast addresses from a server, such as server 122 of FIG. 1. The network interface may thus boot up and reconnect to the medical network in a shorter amount of time. Consequently, the overall booting process for the medical device may also be completed in a shorter amount of time, and may thereby reduce the time needed to prepare a medical room environment for a medical procedure or other subsequent operation.

If the microcontroller instead determines that the network interface should not continue using the multicast addresses stored in memory, the method 400 may proceed to step 440 from step 420 where the microcontroller may clear the multicast address from memory and then enable the network interface. As mentioned above, clearing the multicast addresses from memory may be done in various ways, with some example approaches described further herein. Step 430 of method 400 may correspond to step 340 of method 300, and step 440 of method 400 may correspond to step 350 of method 300.

While method 400 may proceed through each of the steps in order as depicted and described, method 400 may also proceed through the steps in various other orders. For example, instead of proceeding to determining whether to continue using the multicast addresses at step 420 after disabling the network interface at step 410, method 400 may proceed directly to step 440 after step 410. In other words, the microcontroller may clear the multicast addresses from memory after disabling the network interface without first making a determination of whether the network interface should continue using the multicast addresses stored in memory. This may mean that the multicast addresses are cleared from memory every time the medical device powers up after a power loss. While this approach may advantageously provide a stronger guarantee that no multicast address conflicts occur when the network interface reconnects to the medical network, it may be appropriate to consider that such an approach may increase the time needed for a medical system to start up and become fully operational.

Step 420 may also include steps 332 and 334 as described above with respect to FIG. 3B, which may be executed along with steps 422 and 424 in various manners. For example, the microcontroller may execute steps 332 and 334 before steps 422 and 424, or execute steps 422 and 424 before steps 332 and 334. Alternatively, one of the pairs of steps may be executed conditionally based on the other pair of steps. Specifically, steps 332 and 334 may be executed first, where the resulting determination of whether the medical device is in the preselected category of devices may inform whether steps 422 and 424 are to be executed. If the determination was that the medical device is in the preselected category, steps 422 and 424 may be executed, whereas steps 422 and 424 may not be executed if the medical device was not in the preselected category. In a similar manner, steps 422 and 424 may instead be executed first to determine whether the medical device has moved to a new location. If the medical device has moved to a new location, then steps 332 and 334 may be executed, and if the medical device has not moved, then steps 332 and 334 may not be executed. This way, determining whether to continue using the multicast addresses stored in memory may depend on both the medical device being in a preselected category and being moved to a new location, but if one of those conditions is not met, the other determination may be skipped. Thus, the flow of method 400 may proceed from step 410 to step 422 and then to step 332 of method 300, or from step 410 to step 332 of method 300 and then to step 422. The flow of method 400 may also skip step 332 in the former depending on the determination from step 422, and the flow of method may skip step 422 in the latter depending on the determination from step 332 of method 300. In other words, step 420 of method 400 and step 330 of method 300 in FIG. 3B may be integrated, and depending on the specific manner of integration, method 400 may remain unchanged, be altered to include the steps from both methods, or become method 300 of FIG. 3B.

Figure 4B:
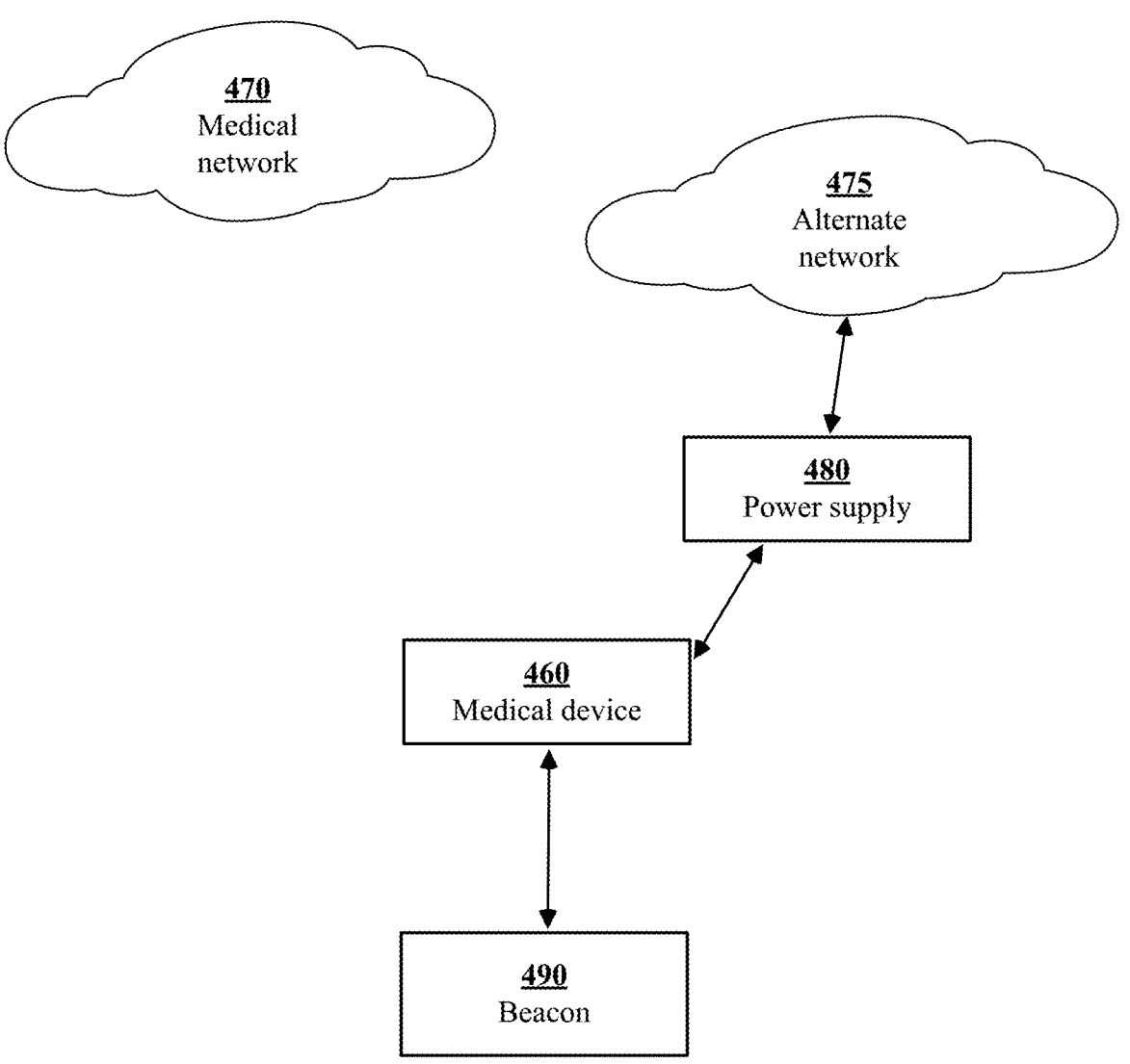
FIG. 4B illustrates a schematic of how the medical device may receive location data to determine whether its network interface should continue using the multicast addresses stored in memory.

FIG. 4B illustrates a schematic 450 of how a medical device may receive location data to determine whether its network interface should continue using the multicast addresses stored in memory. The schematic 450 may include a medical device 460 configured to transmit and/or receive a data stream through a medical network 470. The medical device 460 may correspond to the data source medical device 210 or data sink medical device 240 of FIG. 2 and a microcontroller of the medical device 460 may execute method 400 of FIG. 4A. The medical device 460 may not be connected to the medical network 470 as the medical device 460 may have lost power and thus had its network interface disabled, such as from step 410 of method 400, and the microcontroller may be executing step 420 to determine whether the medical device 460 should continue using the multicast address stored in its memory. In making that determination, the microcontroller of the medical device 460 may execute step 422 of method 400 to determine whether the medical device 460 has moved to a new location, which may include receiving location data at step 424.

Prior to connecting to the medical network 470, the medical device 460 may connect to another communication channel separate from the medical network 470 in order to receive its current location data without prematurely connecting to the medical network 470 and potentially causing multicast address conflicts. This may be alternate network 475, which may be a wireless or wired network separate from the medical network 470. The medical device may include another network interface or other communication system for connecting to the alternate network 475, which may be separate from the network interface for connecting to the medical network 470. As such, the medical device 460 may connect to the alternate network 475 using a different approach, such as through an electrical power supply 480. This way, the medical device 460 may rely on power-line communication to connect to the alternate network 475. Although a power supply 480 is depicted as the approach used to connect to the alternate network 475, any approach may be used to connect to the alternate network 475. As such, the medical device 460 may also connect to the alternate network 475 over Bluetooth, WiFi, ZigBee, or Ethernet, among many others. For example, the alternative network 475 may be a mesh wireless network.

The alternate network 475 may also provide the medical device's location data in any appropriate manner. For example, the alternate network 475 may include nodes capable of triangulating the medical device's location based on where the request from the medical device was received. In other words, when the medical device 460 connects to the alternate network 475 and submits a request for the medical device's current location data, nodes on the alternate network 475 may triangulate the source of the request and return the resulting location data as a response to the medical device 460. Alternatively, the alternate network 475 may include nodes, such as a server, that stores its own location data and simply returns the location data as a response to the medical device 460 upon request. However, many other approaches may also be appropriate. The alternate network 475 may be a single network that provides location data to different medical devices in a plurality of environments associated with a plurality of medical networks. Alternatively, the alternate network 475 may be a series of separate networks each of which are associated with a corresponding medical network 470. Each network in the series of alternate networks may be a limited range network that provides location data to the medical devices within its range of operation, similar to the limited range of the medical network 470.

Rather than receiving location data from a remote source like an alternate network 475, the medical device 460 may instead analyze its environment to obtain the data about its current location, which may be achieved in any appropriate manner. For example, a beacon 490, which may be a single beacon or multiple beacons, may be positioned at the various locations in which the medical device 460 may operate. The beacon 490 may broadcast a signal throughout the location in which it is positioned, where the signal may include the location data for the particular location. For example, a beacon 490 may be positioned in each medical room environment which broadcasts a signal with the location data for the medical room environment. The signal may be broadcasted using any appropriate medium, such as radio waves or ultrasonic waves. The medical device 460 may be equipped with a sensor for detecting the signal such that when the medical device 460 is powered up after a power loss, the medical device 460 may detect and analyze the signal being broadcasted by the beacon 490 to receive its current location data. If the beacon 490 is broadcasting a radio wave signal, the medical device 460 may be equipped with a radio wave receiver to detect the radio wave signal. The microcontroller of the medical device 460 may then retrieve the location data from the received signal to make the determination on whether the medical device 460 has moved to a new location, as described above with respect to step 422 of method 400.

A related approach may be to equip the medical device 460 with a light sensor for detecting light signals. An approach similar to Li-Fi based communication may then be applied, where the light signal detected by the light sensor may include the location data for the current location. The microcontroller of the medical device 460 may then retrieve the location data from the light signal and compare it against location data stored in the memory of the medical device 460 to determine whether the medical device 460 has moved to a new location. As another example, the light sensor may detect different light frequencies, and each medical room environment may be configured with lights at slightly different frequencies. Upon powering up the medical device 460, the light sensor on the medical device 460 may detect the light in the current medical room environment. The microcontroller of the medical device 460 may then retrieve the frequency of the detected light and compare it against the frequency of the light detected before the power loss, which may be stored in the medical device's memory. The determination on whether the medical device 460 has moved to a new location may then be based on whether the newly detected light frequency differs from the stored light frequency. Alternatively, the microcontroller for the medical device 460 may access, either from the memory of the medical device 460 or received from a remote source like alternate network 475, a table with the light frequencies in different medical room environments. The microcontroller may identify the medical room environment corresponding to the light frequency that was just detected using that table. Then, based on whether the corresponding medical room environment differs from the previous medical room environment before the power loss, the microcontroller may determine whether the medical device 460 has moved to a new location. Although some approaches for how the medical device 460 may receive its current location data are described, many other approaches may be appropriate.

Figure 5:
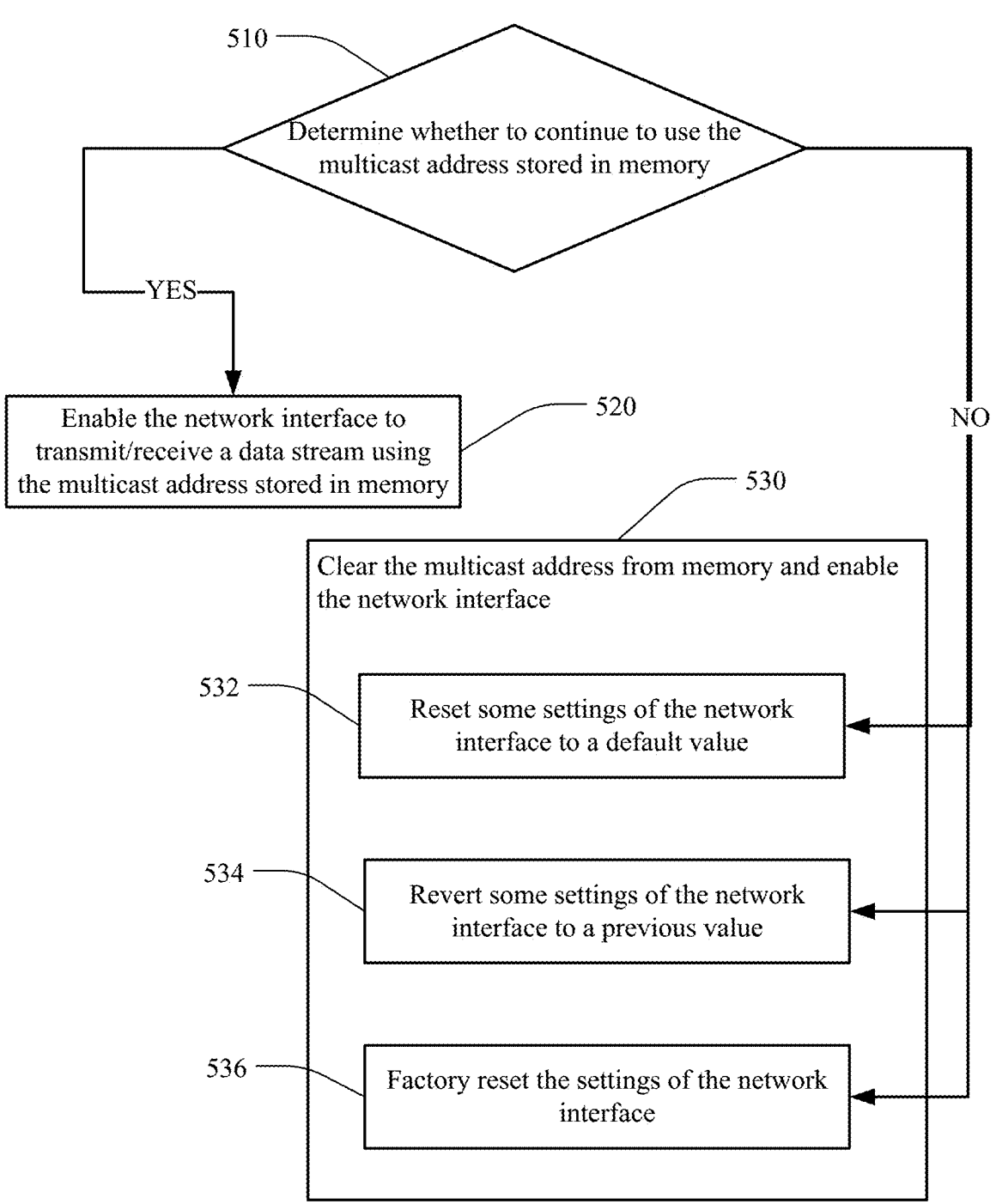
FIG. 5 illustrates a method for managing the multicast addresses stored in memory when a medical device reconnects to a medical network.

FIG. 5 illustrates a method 500 for managing the multicast addresses stored in memory when a medical device reconnects to a medical network. The method 500 may also be executed by a microcontroller of a medical device, such as microcontroller 230b or 260b of data source medical device 210 or data sink medical device 240 of FIG. 2. Method 500 may be an expanded version of steps 330 through 350 of method 300 as described above. The method 500 may include step 510 where a microcontroller determines whether the network interface of a medical device should continue to use the multicast addresses stored in the medical device's memory. Step 510 may correspond to step 330 of method 300. If the microcontroller of the medical device determines that the network interface should continue to use the multicast addresses stored in memory, method 500 may proceed to step 520 where the microcontroller may enable the network interface to transmit and receive a data stream through the medical network using the multicast addresses stored in memory. Step 520 may correspond to step 340 of method 300.

If the microcontroller of the medical device instead determines that the network interface should not continue using the multicast addresses stored in memory, the method 500 may proceed to step 530 where the microcontroller may clear the multicast address from memory and then enable the network interface. Step 530 may correspond to step 350 of method 300. As described above with respect to step 350, the multicast addresses may be cleared from memory in various ways. For example, clearing the multicast addresses from memory may include resetting a subset of the settings of the network interface to a default value at step 532. In this case, the settings that are reset may be the settings corresponding to the multicast addresses to which the network interface may be assigned or subscribed. Other settings in the network interface, such as a transmission speed when transmitting a data stream through the medical network, may be maintained and not reset as they be relevant to the network interface's operation even after a power loss and may not contribute to causing any multicast address conflicts even if they are not reset. The default value may be any value that functions to clear the multicast addresses from memory, such as an empty or null value that does not represent any multicast address that exists on a medical network. This way, the network interface may no longer have an association with those multicast addresses, which may effectively release (in the case of an encoder network interface) or unsubscribe (in the case of a decoder network interface) the network interface from those multicast addresses.

Alternatively, instead of resetting the settings to a default value, the microcontroller may revert a subset of the settings of the network interface to a previous value at step 534. The previous values that the settings may be reverted to may be stored in the non-volatile memory of the medical device so they are accessible even after a power loss. The settings to revert may also still be the settings corresponding to the multicast addresses to which the network interface was previously assigned or subscribed. The previous values that the settings may be reverted to may be the multicast addresses that the network interface had previously been assigned or subscribed to at an earlier point in time. This approach may be appropriate in cases where the medical device is returned to a location in which it had previously been located. For example, a medical device may have been previously positioned at a location $x_1$ at a point in time $t_1$, but was subsequently moved to its current location of $x_2$ at a later point in time $t_2$. When the medical device was at location $x_1$, the medical device's network interface may have been assigned and/or subscribed to a first set of multicast addresses $s_1$. When the medical device was moved to location $x_2$, the network interface may have been assigned and/or subscribed to a different set of multicast addresses $s_2$, but the original set of multicast addresses $s_1$ may have been maintained in the medical device's memory. When the medical device is then moved back to location $x_1$ at a third point in time $t_3$, the microcontroller may detect that the medical device had previously been positioned at this location, and instead of completely clearing the multicast addresses from the medical device's memory, the network interface may be re-assigned or re-subscribed to the first set of multicast addresses $s_1$. Although this approach may assume that the first set of multicast addresses $s_1$ are still valid, which may require additional information to be supplied to the medical device's microcontroller, this may allow the network interface to connect to the medical network and immediately begin transmitting/receiving data streams through the medical network, even though the multicast addresses had been "cleared" to an extent. As a result, this may reduce the configuration time needed when the network interface reconnects to the medical network after a power loss. Additional settings, such as the transmission speed and bandwidth utilization when the network interface transmits data streams to and/or receives data streams from the medical network, may also be reverted to previous values corresponding to the medical network that the network interface will connect to upon the medical device powering up.

Another approach for clearing the multicast addresses from memory may be to factory reset the settings of the network interface at step 536. This may include resetting all the settings of the network interface to the default values when the network interface was first manufactured, without distinguishing which settings correspond to the multicast addresses. Because there may be fewer and/or simpler operations to perform when factory resetting all the network interface's settings, this approach may reduce the total amount of time needed to release (in the case of an encoder network interface) or unsubscribe (in the case of a decoder network interface) the network interface from the multicast addresses stored in memory, as compared to selectively resetting specific settings.

Figure 6:
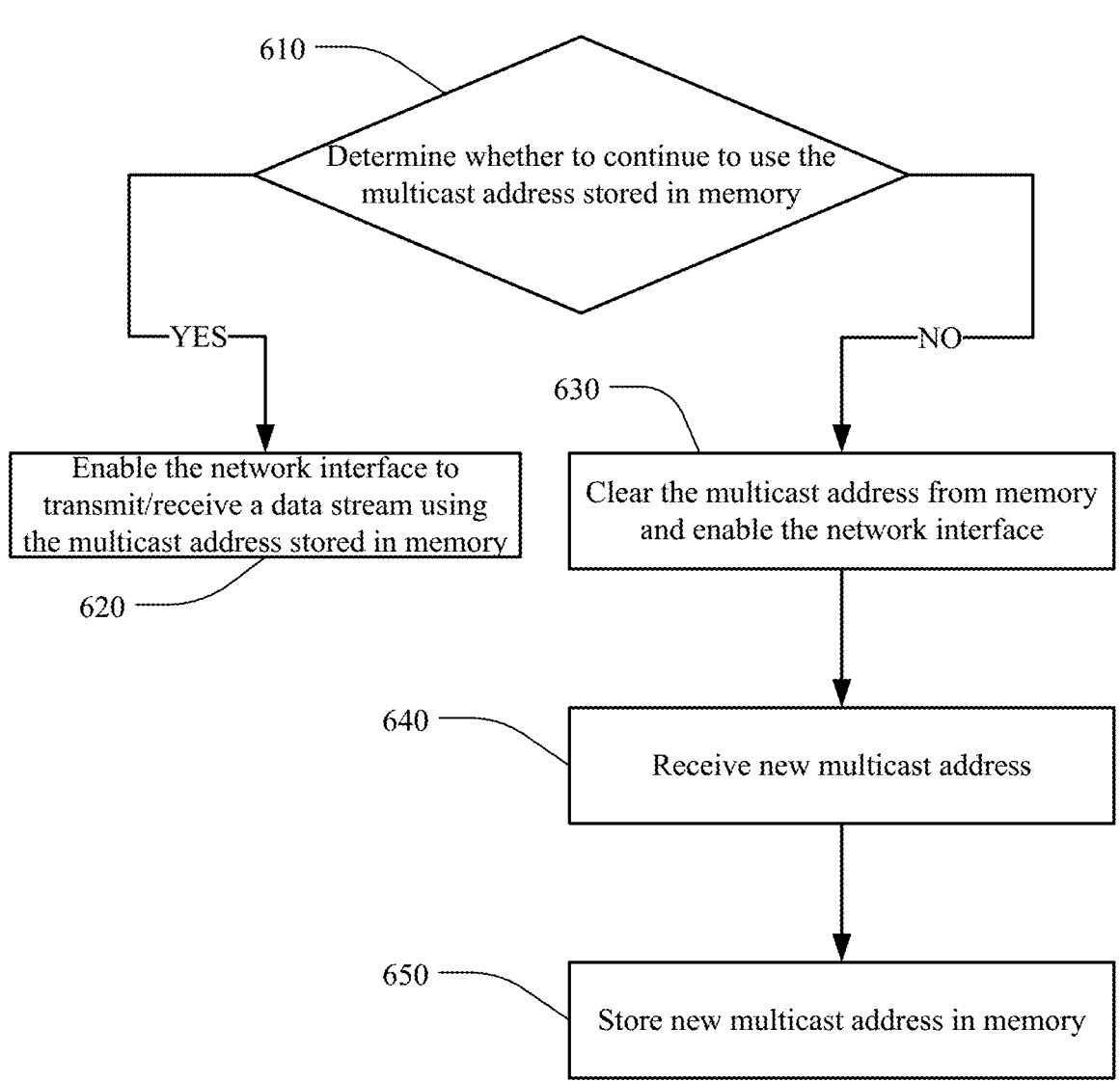
FIG. 6 illustrates a method with additional steps for reconnecting a medical device to a medical network.

FIG. 6 illustrates a method 600 with additional steps for reconnecting a medical device to a medical network. Method 600 may be an extension of method 300 as described above. The method 600 may also be executed by a microcontroller of a medical device, such as microcontroller 230b or 260b of data source medical device 210 or data sink medical device 240 of FIG. 2. The method 600 may include step 610, where the microcontroller may determine whether the network interface should continue to use the multicast addresses stored in memory to transmit and/or receive a data stream through the medical network. Step 610 may correspond to step 330 of method 300. If the microcontroller determines that the network interface should continue to use the multicast addresses stored in memory, method 600 may proceed to step 620 where the microcontroller may enable the network interface to transmit and receive a data stream through the medical network using the multicast addresses stored in memory. Step 620 may correspond to step 340 of method 300. If instead the microcontroller determines that the network interface should not continue using the multicast addresses stored in memory, the method 600 may proceed to step 630 where the microcontroller may clear the multicast address from memory and then enable the network interface. Step 630 may correspond to step 350 of method 300.

Since the multicast addresses were cleared, the network interface may not be associated with any multicast addresses when it reconnects to the medical network. As such, the network interface may receive new multicast addresses at step 640. The new multicast addresses may include those that the network interface is newly assigned to transmit a data stream to (in the case of an encoder network interface)

or those that the network interface is newly subscribed to receive a data stream from (in the case of a decoder network interface). The microcontroller may then store the newly received multicast addresses in the medical device's memory at step 640.

Figure 7:
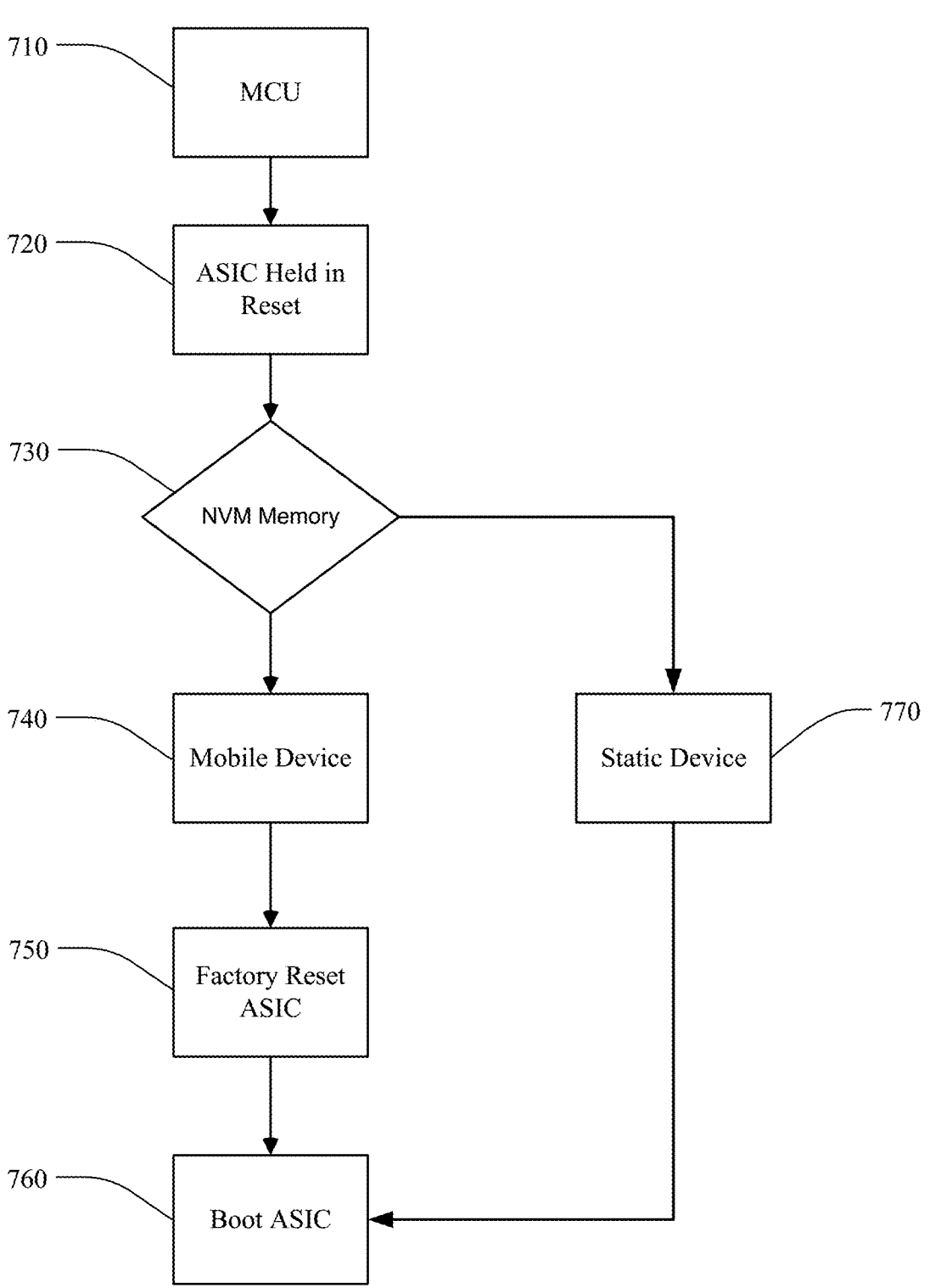
FIG. 7 illustrates a schematic of an example for controlling how a medical device transmits and/or receives at least one data stream through a medical network.

FIG. 7 illustrates a schematic 700 of an example for controlling how a medical device transmits and/or receives at least one data stream through a medical network, which may correspond to various steps of method 300, method 400, and method 500. A microcontroller (MCU) 710 of a medical device may execute various steps of method 300, 400, and 500 as described above upon the medical device powering up after a power loss. When the medical device powers up, the MCU 710 may hold an ASIC in reset 720 to prevent the medical device from connecting to a medical network and potentially causing multicast address conflicts. The ASIC may correspond to the network interface described above. As described above, this may be achieved in various ways, such as preventing the ASIC from powering up or activating a pin on the medical device to interrupt the ASIC's boot up process. The MCU holding the ASIC in reset at 720 may correspond with step 320 of method 300 or step 410 of method 400. The MCU 710 may then access the non-volatile memory (NVM) 730 of the medical device to determine whether the ASIC should continue using the multicast addresses stored in memory, which may correspond to step 330 of method 300 or step 420 of method 400. Here, the determination may be based on whether the medical device is a mobile medical device as described above with respect to step 334 of method 300. If the MCU 710 determines that the medical device is a mobile medical device 740, the MCU 710 may make the determination that the ASIC should not continue using the multicast addresses stored in NVM 730. As such, the MCU 710 may factory reset the ASIC 750 in order to clear the multicast addresses from NVM 730 before fulling booting up the ASIC 760 to reconnect to the medical network and receive new multicast addresses. This may correspond to steps 530 and 536 of method 500. If instead the MCU 710 determines that the medical device is a static device 770, the MCU 710 may make the determination that the ASIC should continue using the multicast addresses stored in NVM 730. Thus, the MCU 710 may proceed directly from accessing the NVM 730 to booting up the ASIC 760 to reconnect to the medical network. This determination may correspond to step 340 of method 300 or step 430 of method 400.

Particular examples may repeat one or more steps of the methods of FIGS. 3A, 3B, 4A, 5, and 6 where appropriate. Although this disclosure describes and illustrates particular steps of the methods of FIGS. 3A, 3B, 4A, 5, and 6 as occurring in a particular order, this disclosure contemplates any suitable steps of the methods of FIGS. 3A, 3B, 4A, 5, and 6 occurring in any suitable order. Moreover, although this disclosure describes and illustrates example methods for controlling how a medical device transmits and/or receives at least one data stream through a medical network including the particular steps of the methods of FIGS. 3A, 3B, 4A, 5, and 6, this disclosure contemplates any suitable method for controlling how a medical device transmits and/or receives at least one data stream through a medical network including any suitable steps, which may include all, some, or none of the steps of the methods of FIGS. 3A, 3B, 4A, 5, and 6, where appropriate. Furthermore, although this disclosure describes and illustrates particular components, devices, or systems carrying out particular steps of the methods of FIGS. 3A, 3B, 4A, 5, and 6, this disclosure contemplates any suitable combination of any suitable components, devices, or systems carrying out any suitable steps of the methods of FIGS. 3A, 3B, 4A, 5, and 6.

Figure 8:
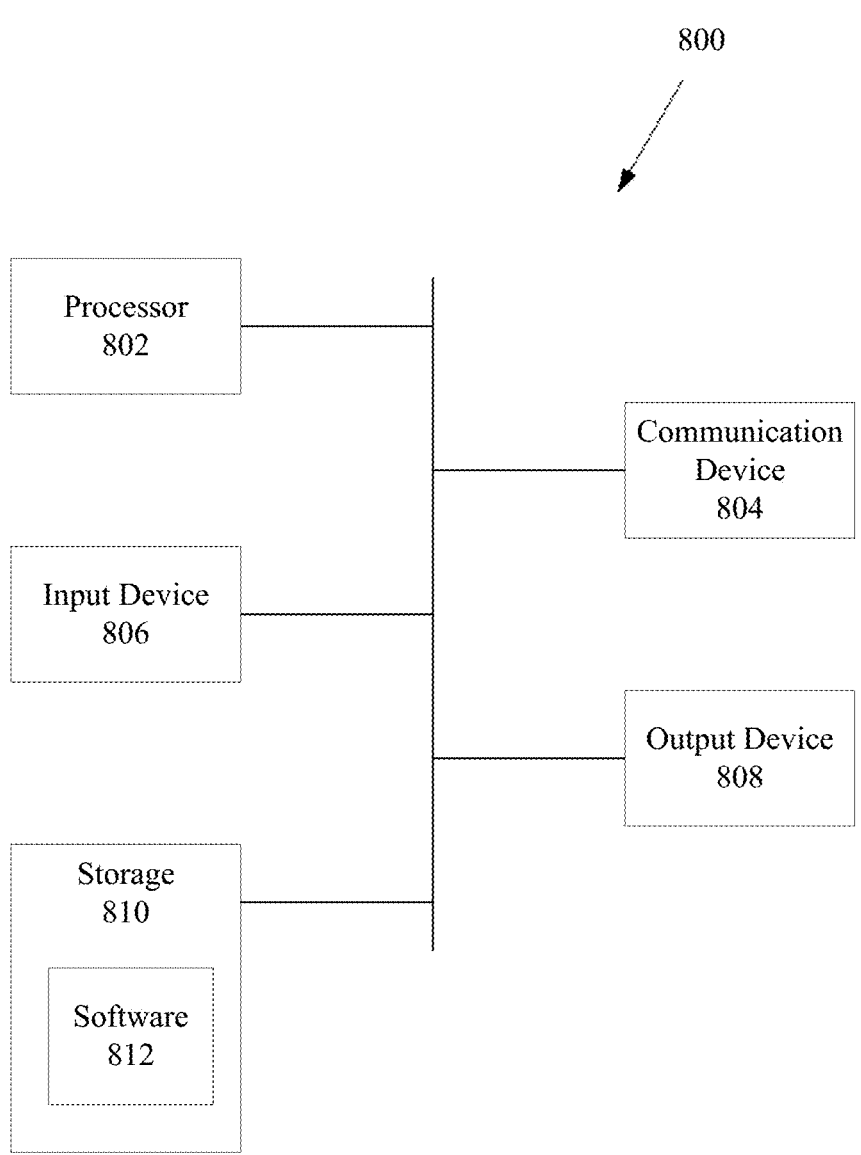
FIG. 8 illustrates an example computer system.

FIG. 8 illustrates an example of a computing system 800, in accordance with one or more examples of the disclosure. Computing system 800 can be a computer connected to a network. Computing system 800 can be a client computer or a server. As shown in FIG. 8, computing system 800 can be any suitable type of microprocessor-based device, such as a personal computer, workstation, server, or handheld computing device (portable electronic device) such as a phone or tablet, or dedicated device. The computing system can include, for example, one or more of processors 802, input device 806, output device 808, storage 810, and communication device 804.

Input device 806 and output device 808 can generally correspond to those described above and can either be connectable or integrated with the computer.

Input device 806 can be any suitable device that provides input, such as a touch screen, keyboard or keypad, mouse, or voice-recognition device. Output device 808 can be any suitable device that provides output, such as a touch screen, haptics device, or speaker.

Storage 810 can be any suitable device that provides storage, such as an electrical, magnetic, or optical memory, including a RAM, cache, hard drive, removable storage disk, or other non-transitory computer readable medium. Communication device 804 can include any suitable device capable of transmitting and receiving signals over a network, such as a network interface chip or device. The components of the computing system can be connected in any suitable manner, such as via a physical bus or wirelessly.

Processor(s) 802 can be any suitable processor or combination of processors, including any of, or any combination of, a central processing unit (CPU), field programmable gate array (FPGA), and application-specific integrated circuit (ASIC). Software 812, which can be stored in storage 810 and executed by processor 802, can include, for example, the programming that embodies the functionality of the present disclosure (e.g., as embodied in the devices as described above).

Software 812 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 810, that can contain or store programming for use by or in connection with an instruction execution system, apparatus, or device.

Software 812 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Computing system 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computing system 800 can implement any operating system suitable for operating on the network. Software 812 can be written in any suitable programming language, such as C, C++, Java, or Python. In various examples, application software embodying the functionality of the present disclosure can be deployed in different configurations, such as in a client/server arrangement or through a Web browser as a Web-based application or Web service, for example.

The foregoing description, for the purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method of controlling a medical device for transmitting and/or receiving at least one data stream through a medical network, comprising:

transmitting and/or receiving the at least one data stream over the medical network by a network interface of the medical device using at least one multicast address stored in a memory of the medical device; and upon powering up of the medical device after a power loss to the medical device:

disabling the network interface from transmitting and/or receiving the at least one data stream using the at least one multicast address stored in the memory, determining whether to continue to use the at least one multicast address stored in the memory, in accordance with a determination to continue to use the at least one multicast address stored in the memory, enabling the network interface such that the network interface can transmit and/or receive the at least one data stream using the at least one multicast address stored in the memory, and in accordance with a determination not to continue to use the at least one multicast address stored in the memory, clearing the at least one multicast address from the memory and enabling the network interface.

2. The method of claim 1, further comprising upon being enabled after the at least one multicast address has been cleared, the network interface newly obtaining one or more multicast addresses.

3. The method of claim 1, wherein disabling the network interface from transmitting and/or receiving the at least one data stream using the at least one multicast address comprises preventing the network interface from connecting to the medical network.

4. The method of claim 1, wherein disabling the network interface from transmitting and/or receiving the at least one data stream using the at least one multicast address comprises preventing the network interface from fully booting.

5. The method of claim 1, wherein disabling the network interface from transmitting and/or receiving the at least one data stream using the at least one multicast address comprises preventing the network interface from powering on.

6. The method of claim 1, wherein determining whether to continue to use the at least one multicast address comprises determining whether the medical device is in a preselected category of medical devices, and wherein the determination not to continue to use the at least one multicast address comprises a determination that the medical device is in the preselected category of medical devices.

7. The method of claim 6, wherein the preselected category of medical devices comprises mobile medical devices.

8. The method of claim 1, wherein determining whether to continue to use the at least one multicast address stored in the memory comprises determining whether the medical device has moved to a new location relative to a location of the medical device prior to the power loss, and wherein the determination not to continue to use the at least one multicast address stored in the memory comprises a determination that the medical device has moved to the new location.

9. The method of claim 8, wherein determining whether the medical device has moved to the new location comprises receiving location data identifying a current location of the medical device and comparing the current location to the location of the medical device prior to the power loss.

10. A medical device for transmitting and/or receiving at least one data stream through a medical network, comprising:

a network interface configured for transmitting and/or receiving the at least one data stream using at least one multicast address stored in first memory; and a controller comprising one or more processors and second memory storing one or more programs for execution by the one or more processors, the one or more programs including instructions for causing the controller to:

disable the network interface from transmitting and/or receiving the at least one data stream using the at least one multicast address stored in the first memory, determine whether to continue to use the at least one multicast address stored in the first memory, in accordance with a determination to continue to use the at least one multicast address stored in the first memory, enable the network interface such that the network interface can transmit and/or receive the at least one data stream using the at least one multicast address stored in the first memory, and in accordance with a determination not to continue to use the at least one multicast address stored in the first memory, clear the at least one multicast address from the first memory and enable the network interface.

11. The medical device of claim 10, wherein the medical device comprises an encoder configured to convert data from a native data format to packetized data, a decoder configured to convert packetized data to a native data format, or both.

12. The medical device of claim 10, wherein the medical device is mobile.

13. The medical device of claim 10, wherein the network interface is further configured for newly obtaining one or more multicast addresses upon being enabled after the at least one multicast address has been cleared.

14. The medical device of claim 10, wherein disabling the network interface from transmitting and/or receiving the at least one data stream using the at least one multicast address comprises preventing the network interface from connecting to the medical network, preventing the network interface from fully booting, or preventing the network interface from powering on.

15. The medical device of claim 10, wherein determining whether to continue to use the at least one multicast address comprises determining whether the medical device is in a preselected category of medical devices, and wherein the determination not to continue to use the at least one multicast address comprises a determination that the medical device is in the preselected category of medical devices.

16. The medical device of claim 15, wherein the preselected category of medical devices comprises mobile medical devices.

17. The medical device of claim 10, wherein determining whether to continue to use the at least one multicast address stored in the first memory comprises determining whether the medical device has moved to a new location relative to a location of the medical device prior to a power loss, and wherein the determination not to continue to use the at least one multicast address stored in the memory comprises a determination that the medical device has moved to the new location.

18. The medical device of claim 17, wherein determining whether the medical device has moved to the new location comprises receiving location data identifying a current location of the medical device and comparing the current location to the location of the medical device prior to the power loss.

19. The medical device of claim 10, wherein the network interface transmitting and/or receiving the at least one data stream comprises at least one of encoding the at least one data stream for transmission through the medical network and decoding the at least one data stream received through the medical network.

20. A non-transitory computer-readable storage medium storing software comprising instructions that when executed by a computing system cause the computing system to perform the method of:

transmitting and/or receiving the at least one data stream over the medical network by a network interface of the medical device using at least one multicast address stored in a memory of the medical device; and upon powering up of the medical device after a power loss to the medical device:

disabling the network interface from transmitting and/or receiving the at least one data stream using the at least one multicast address stored in the memory, determining whether to continue to use the at least one multicast address stored in the memory, in accordance with a determination to continue to use the at least one multicast address stored in the memory, enabling the network interface such that the network interface can transmit and/or receive the at least one data stream using the at least one multicast address stored in the memory, and in accordance with a determination not to continue to use the at least one multicast address stored in the memory, clearing the at least one multicast address from the memory and enabling the network interface.

\* \* \* \* \*